United States Patent [19]

Mosier et al.

[11] Patent Number: 4,525,804
[45] Date of Patent: Jun. 25, 1985

[54] INTERFACE APPARATUS FOR HOST COMPUTER AND GRAPHICS TERMINAL

[75] Inventors: John E. Mosier, Tulsa; Jim B. Surjaatmadja, Duncan; George B. McLawhon, Tulsa, all of Okla.; Jeffrey M. Gallup, Berkeley, Calif.

[73] Assignee: Halliburton Company, Duncan, Okla.

[21] Appl. No.: 436,128

[22] Filed: Oct. 22, 1982

[51] Int. Cl.³ ............................ G06F 5/06; G06F 5/02
[52] U.S. Cl. ................................. 364/900; 340/750
[58] Field of Search ... 364/200 MS File, 900 MS File; 340/750, 724, 798, 799, 800

[56] References Cited

U.S. PATENT DOCUMENTS

| | | | |
|---|---|---|---|
| 3,465,302 | 9/1969 | Andrews et al. | 364/900 |
| 3,744,033 | 7/1973 | Boyd | 364/900 |
| 3,774,156 | 11/1973 | Marsalka et al. | 364/200 |
| 4,148,073 | 4/1979 | Slobodzian et al. | 358/240 |
| 4,247,893 | 1/1981 | Anderson et al. | 364/200 |
| 4,303,986 | 12/1981 | Lans | 364/900 |
| 4,323,896 | 4/1982 | Fiedler et al. | 340/800 |
| 4,435,762 | 3/1984 | Milligan et al. | 364/200 |
| 4,437,093 | 3/1984 | Bradley | 340/726 |

Primary Examiner—James D. Thomas
Assistant Examiner—Thomas Lee
Attorney, Agent, or Firm—E. Harrison Gilbert, III; Joseph A. Walkowski; Thomas R. Weaver

[57] ABSTRACT

A high-speed interface for use between a computer having a Unibus data transmission system and a Tektronix graphics terminal includes elements for converting pairs of coordinate words from the host computer into five seven-bit bytes usable by the Tektronix graphics terminal. The interface is capable of emulating a standard interface device and is also capable of cyclically refreshing the Tektronix graphics terminal so that it can operate in a write-through mode.

7 Claims, 32 Drawing Figures

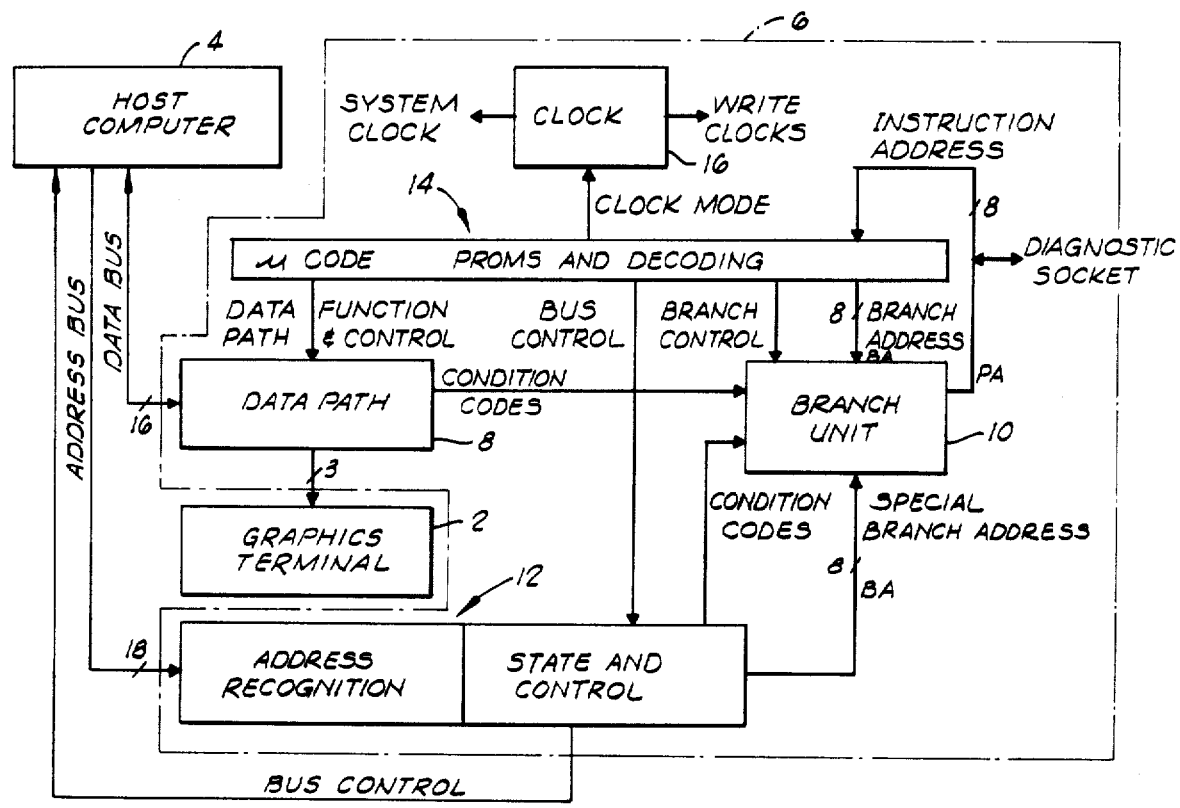
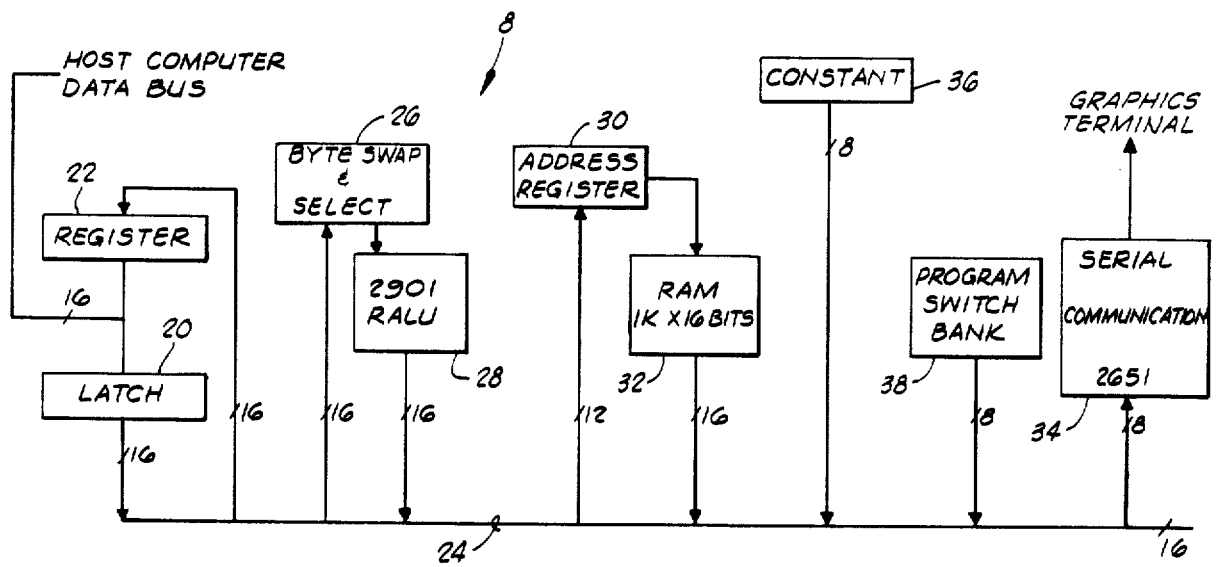
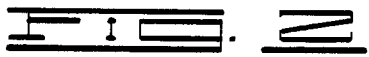

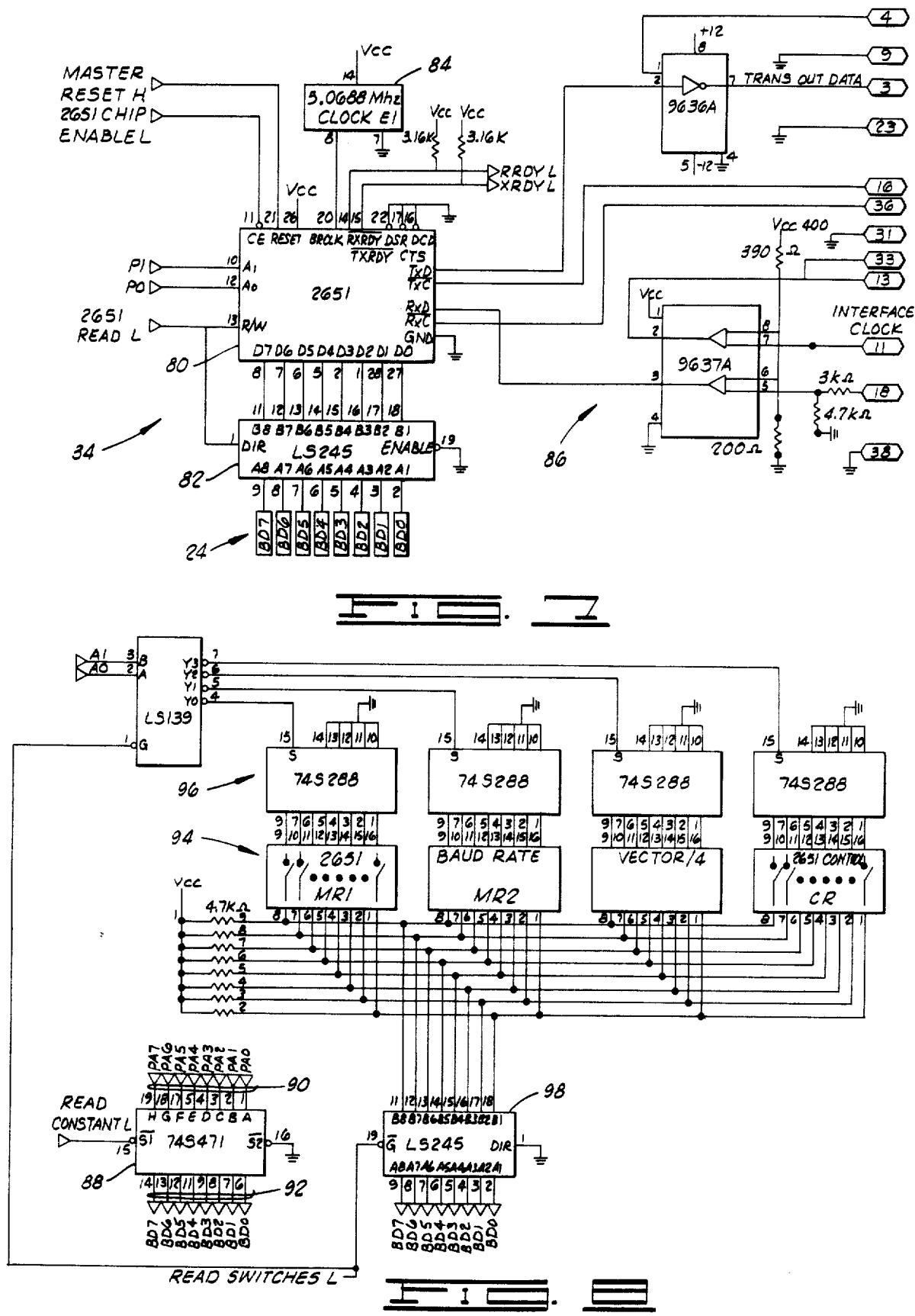

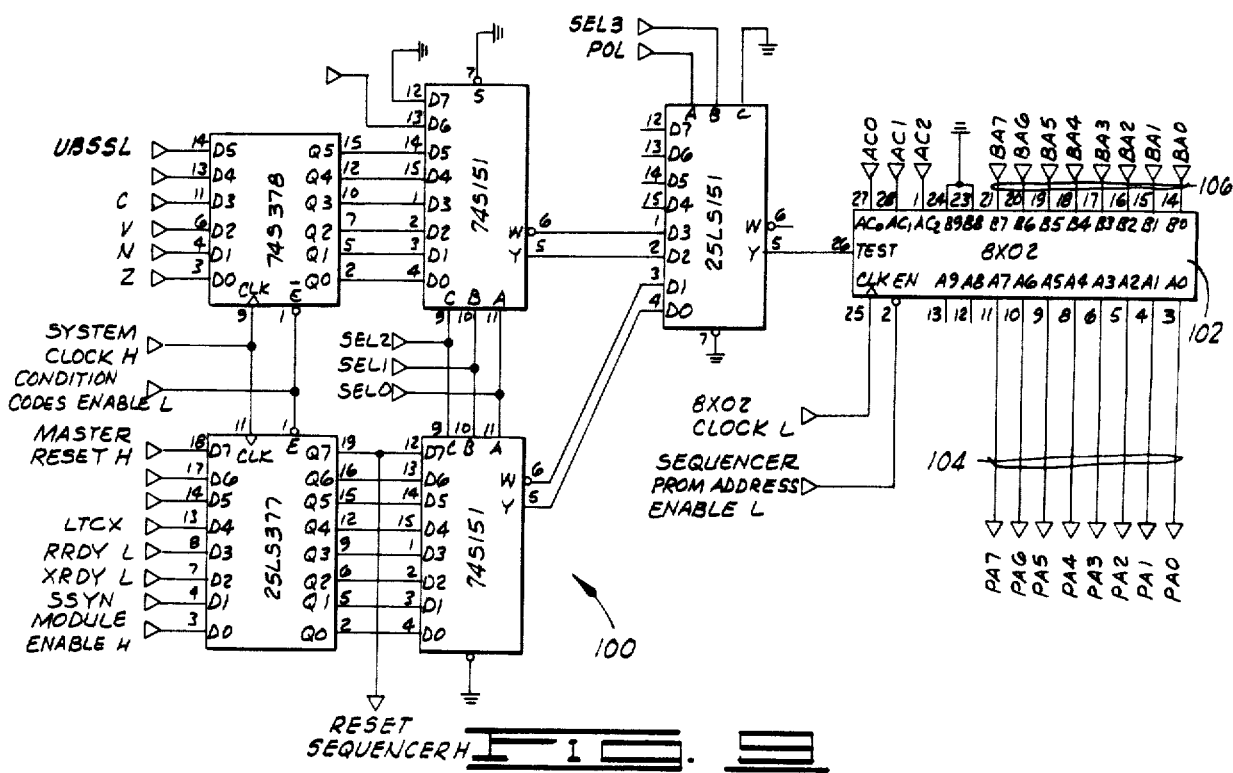
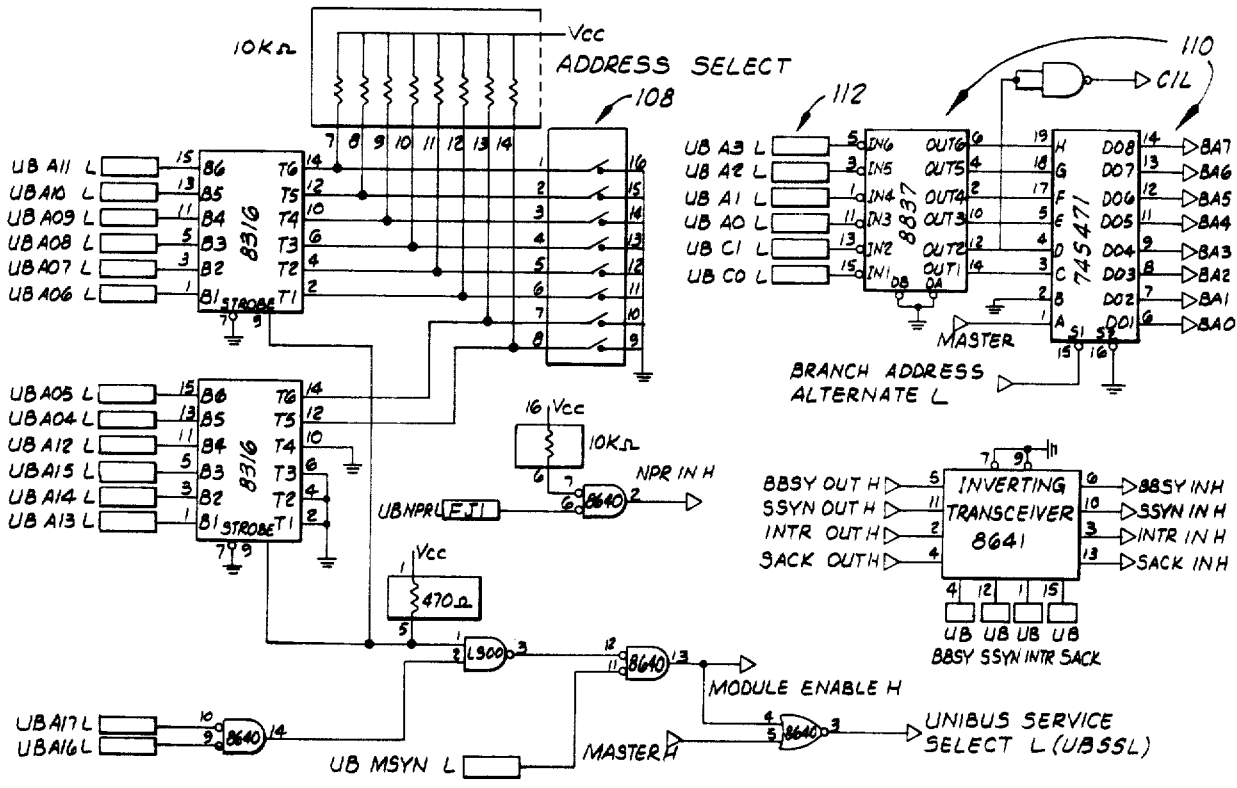

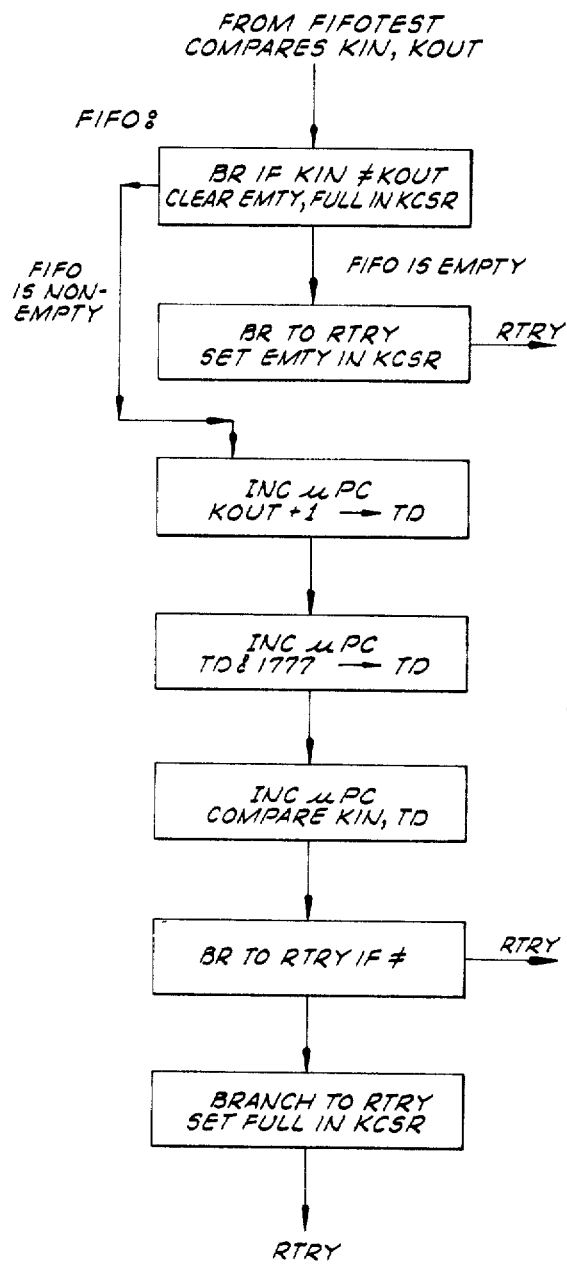
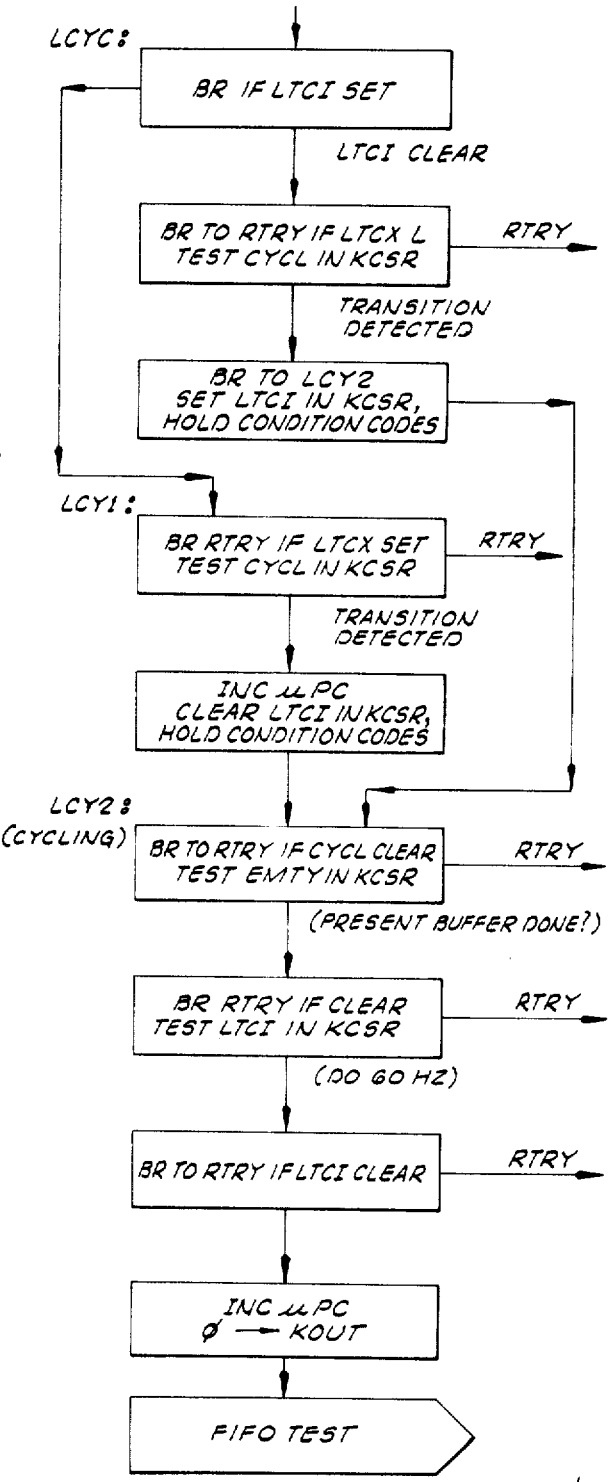
FIG. 19F

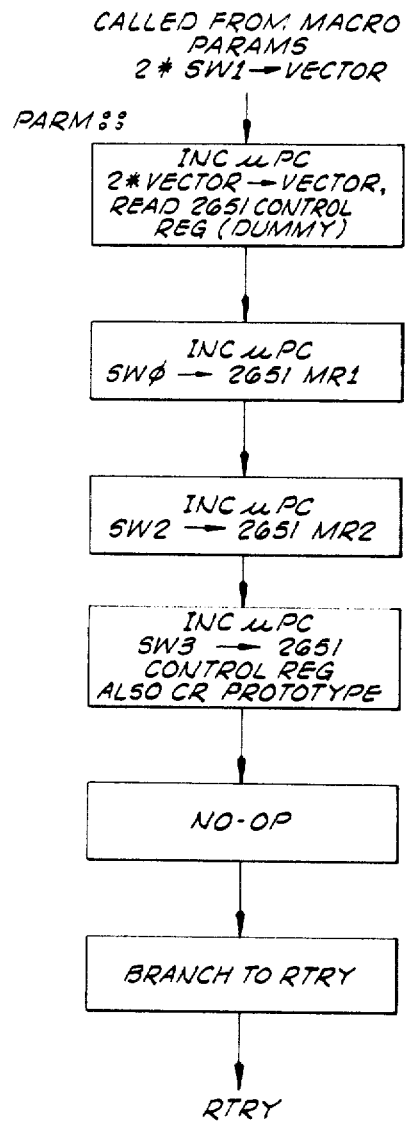
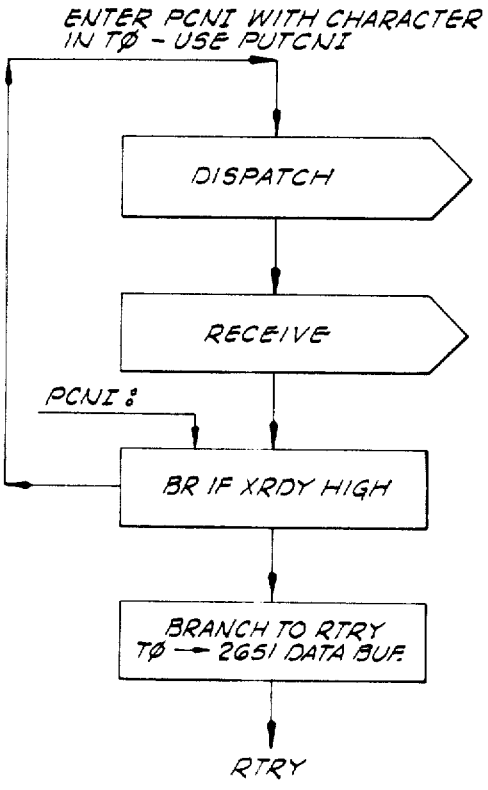
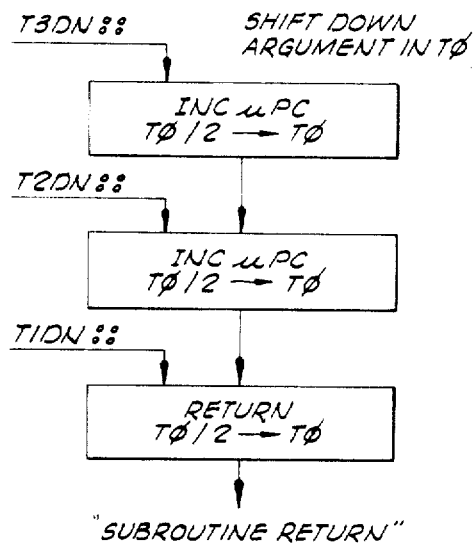
FIG. 15G

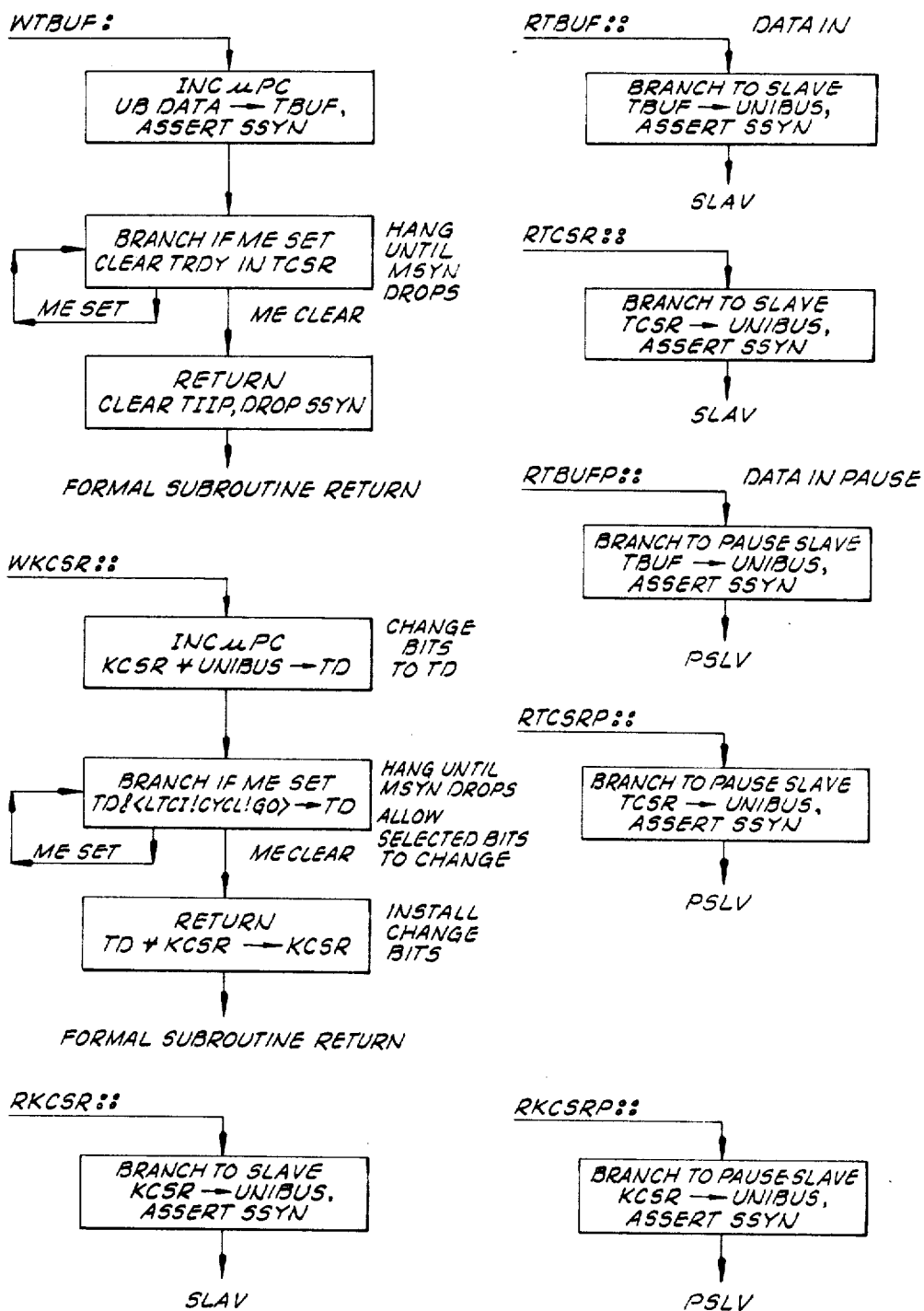

INTERFACE APPARATUS FOR HOST COMPUTER AND GRAPHICS TERMINAL

This invention relates generally to a data transmission interface between a host computer and a graphics terminal and more particularly, but not by way of limitation, to a high-speed interface for coupling a Digital Equipment Corporation PDP-11 computer, having a Unibus data transferal system, with a Tektronix 4014 graphics terminal so that data can be transferred to the graphics terminal at speeds up to its input capability of approximately 307 kilobaud.

To display graphic information generated by means of a computer, the computer is often connected to a graphics display terminal having a screen which can be actuated electronically to display the graphic information. So that the elements of the graphics terminal are able to properly respond to the electrical signals provided by the computer as electrical representations of the graphic information, there is the need for an interface which makes the output of the computer compatible with the input of the graphics terminal.

An interface which is generally suitable can be relatively simple. For example, the interface could include electrical conductors containing line drivers for boosting the signals transferred between the output of the computer and the input of the graphics terminal. With this type of mechanism, however, the computer must perform any format conversions necessary to convert the normal computer output format into a format understandable by the graphics terminal. This can be undesirable because having such a format conversion function performed by the computer prevents the computer from doing other tasks which might be more desirable for it to perform. Additionally, the computer may operate at a slower rate than the graphics terminal is capable of so that if the computer is used to control the data transferal between itself and the graphics terminal, the system will operate inefficiently because time during which the graphics terminal could operate will be lost.

By way of a specific example, a Digital Equipment Corporation PDP-11 computer can be interfaced with a Tektronix 4014 graphics terminal by means of a Digital Equipment Corporation KL-11 serial interface device. This system is limited to data transferal rates of approximately 20–30 kilobaud for several reasons. For example, the KL-11 is an interrupt-per-character device, and the operating system requires substantial overhead to process each interrupt thereby slowing down the system. Additionally, the PDP-11 must convert the format of its normal output into a format understandable by the Tektronix 4014. This relatively simple system is inefficient because the Tektronix 4014 graphics terminal has a capability of receiving and processing information at rates up to approximately 307 kilobaud.

Therefore, there is the need for an interface device and a method which increase the transferal rate or throughput of data to a graphics terminal to enhance the utilization of the overall system. To provide the increased speed, it is desirable to have the interface device make the necessary format transformations. Specifically, it is desirable to have the interface device convert a pair of twelve-bit coordinates, such as are ordinarily provided by a PDP-11 computer, into five seven-bit bytes of information, such as are required by a Tektronix 4014 graphics terminal.

To also provide the increased speed, it is also desirable to have the new interface device operate simultaneously and in parallel with the host computer so that the new interface device operates as a first-in, first-out (FIFO) buffer elastically coupling the program producing the coordinates and their display on the graphics terminal after the coordinates have been stored and reformatted. Elasticity is required because the host computer generally produces coordinates at a typically uneven rate. Likewise, the graphics terminal displays coordinates, vectors and characters at a typically uneven rate.

Because there are currently other types of interface devices, such as the KL-11, it is also desirable that a new interface device be capable of operating in a mode whereby it emulates a present device, such as the KL-11 serial interface.

In addition to having the foregoing attributes, such a new interface device should also have the capability of retransmitting information to the graphics terminal in the event the graphics terminal is capable of operating in what is known as a "write-through" mode. With a graphics terminal of the type exemplified by the Tektronix 4014 graphics terminal, data can be written through so that an image can be moved across the screen of the graphics terminal without retaining former images. When such a graphics terminal normally displays a stationary figure, an electron beam having a sufficiently high voltage impinges upon the screen of the graphics terminal and causes the screen to retain the image without having to continuously cycle the same data controlling the electron beam. However, if the voltage of the electron beam is not sufficiently high, once the beam passes a particular location, whatever image was displayed by the beam disappears. In this latter mode, referred to as the "write-through" mode, it is necessary to refresh the picture by continuously recycling the control data to recycle the electron beam.

The present invention provides a novel and improved interface device and method having and providing the speed, memory and computational circuitry necessary to meet the above-noted needs. In particular, the present invention provides an interface between a computer having a Unibus data transferal system, such as is found in a Digital Equipment Corporation PDP-11 computer, and a Tektronix 4014 graphics terminal. The interface of the present invention is capable of receiving data from the Unibus system, converting the data into a format usable by the Tektronix 4014 graphics terminal, and transferring the converted data to the Tektronix 4014 graphics terminal at rates of speed up to the operating speed of the Tektronix graphics terminal. This interface operates simultaneously and in parallel with the computer as a FIFO buffer elastically coupling the program producing the coordinates and their display on the graphics terminal. The device of the present invention also is capable of operating in a mode wherein the device emulates a KL-11 serial interface. The present invention can also recycle the data transmitted to the graphics terminal to accommodate a graphics terminal which can be operated in a "write-through" mode.

Broadly, the apparatus of the present invention includes receiver means for receiving electrically coded information from a host computer. The apparatus also includes storage means for providing addressable locations where the electrically coded information received from the host computer can be stored. The present invention further includes control means which responds to predetermined ones of the electrically coded information by being placed in either a first mode of operation or a second mode of operation. In the first mode of operation the control means transfers the electrically coded information substantially directly to the graphics terminal in a manner similar to the operation of a KL-11 serial interface. In the second mode the control means transfers the electrically coded information to the storage means for subsequent high-speed transmission to the graphics terminal. In the second mode of operation the control means utilizes means for converting a pair of coordinates provided by the host computer into a group of five bytes of binary information usable by the graphics terminal. The control means also includes cycle means for retransmitting to the graphics terminal the information stored in the storage means when the graphics terminal is operated in a write-through mode.

Therefore, from the foregoing, it is a general object of the present invention to provide a novel and improved interface device and method. Other and further objects, features and advantages of the present invention will be readily apparent to those skilled in the art when the following description of the preferred embodiment is read in conjunction with the accompanying drawings.

FIG. 1 is a block diagram of the preferred embodiment of the apparatus of the present invention.

FIG. 2 is a functional block diagram of the data path portion of the embodiment shown in FIG. 1.

FIG. 7 is a schematic circuit diagram of the serial communication element shown in FIG. 2.

FIG. 8 is a schematic circuit diagram of the constant and program switch bank elements shown in FIG. 2.

FIG. 9 is a schematic circuit diagram of the branch unit portion of the embodiment shown in FIG. 1.

FIG. 10 is a schematic circuit diagram of the address recognition portion of the embodiment shown in FIG. 1.

Figure 12A:
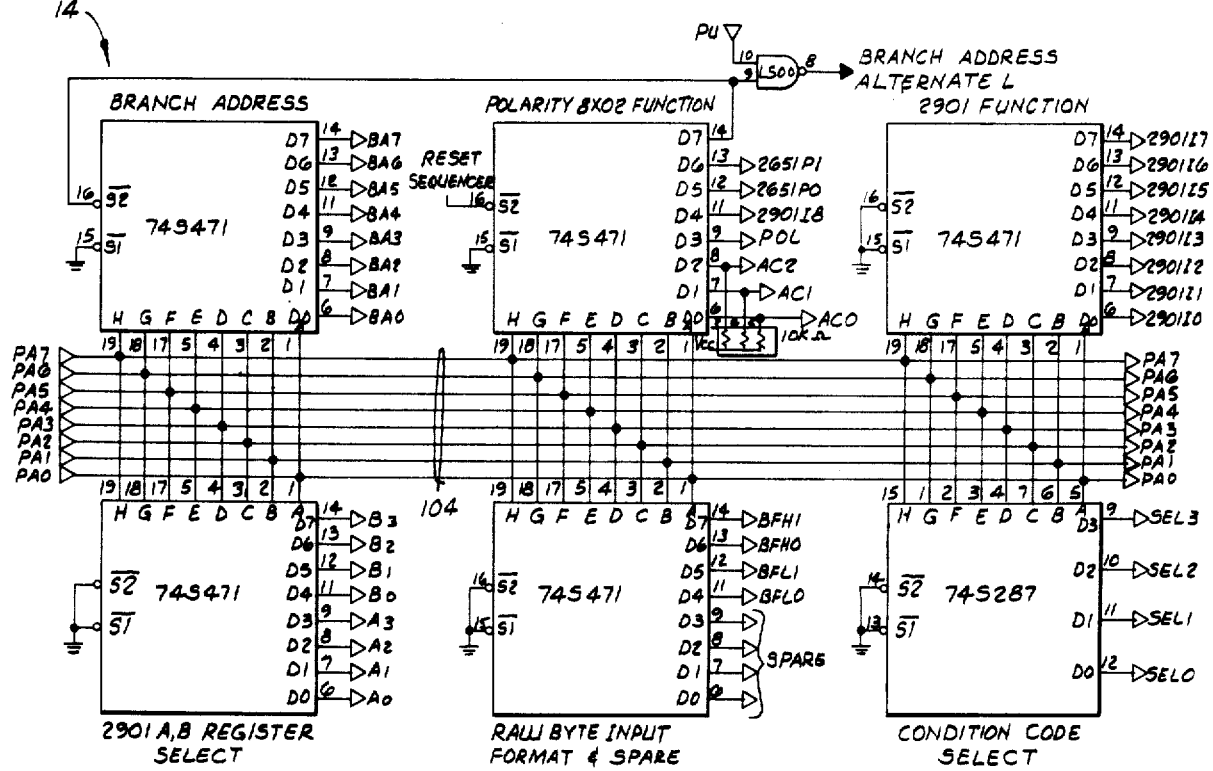
Figure 12B:
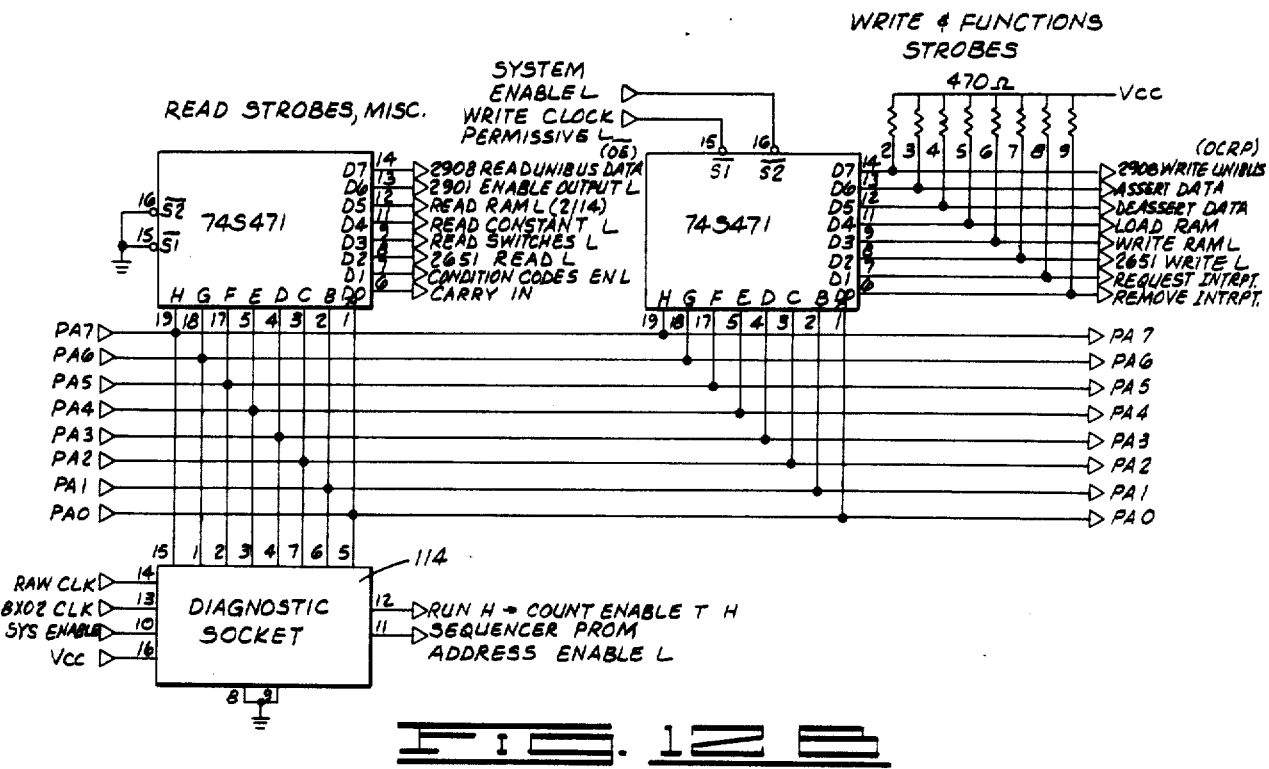

FIGS. 12A-12B form a schematic circuit diagram of the microcode portion of the embodiment shown in FIG. 1.

Figure 13:
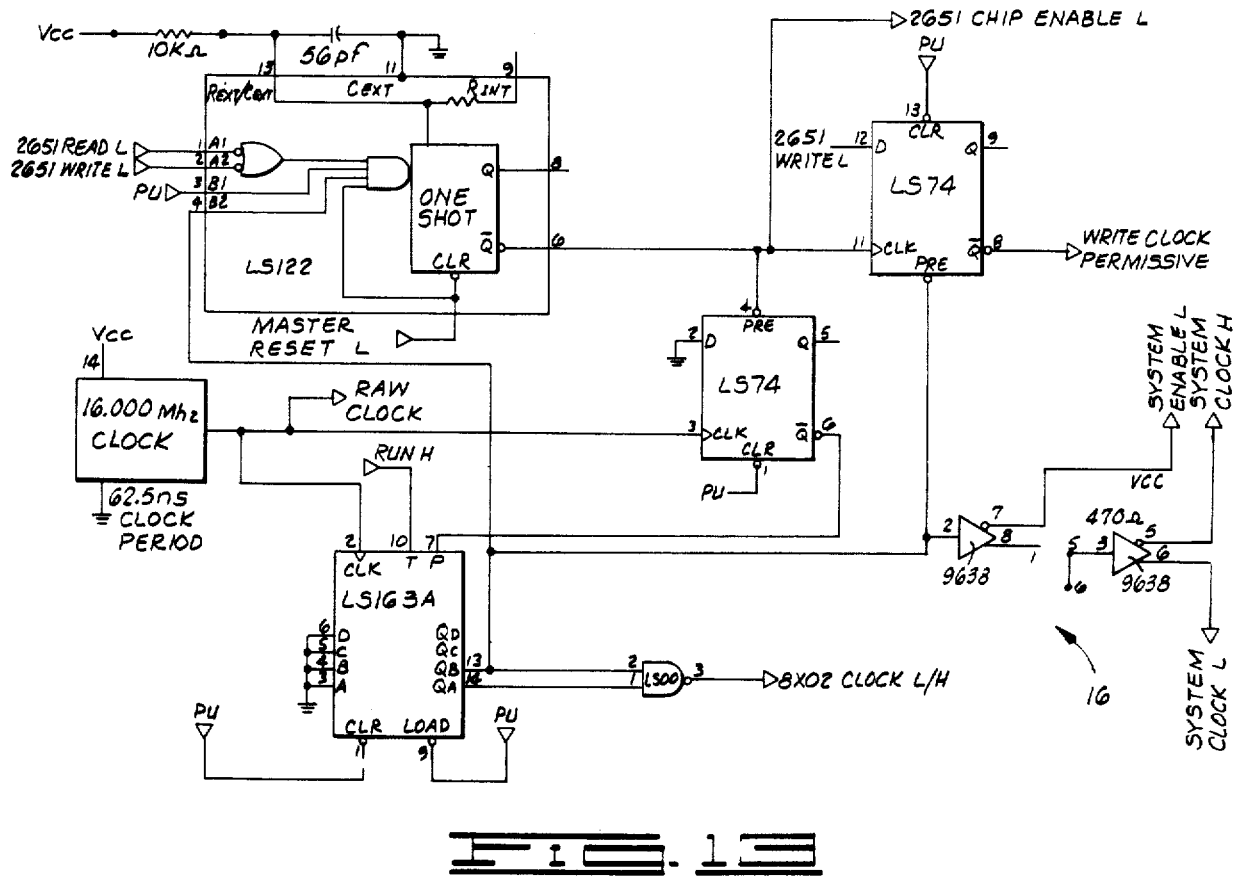

FIG. 13 is a schematic circuit diagram of the clock portion of the embodiment shown in FIG. 1.

Figure 14:
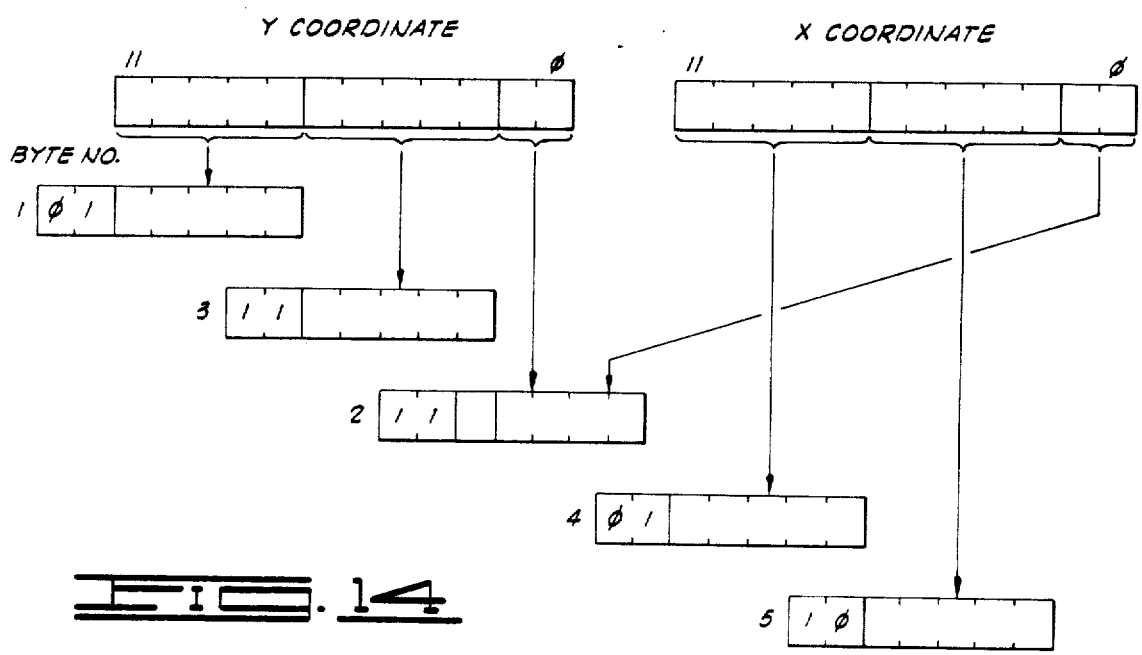

FIG. 14 is a schematic illustration of the conversion of two twelve-bit coordinates into five seven-bit bytes performed by the present invention.

Figure 15B:
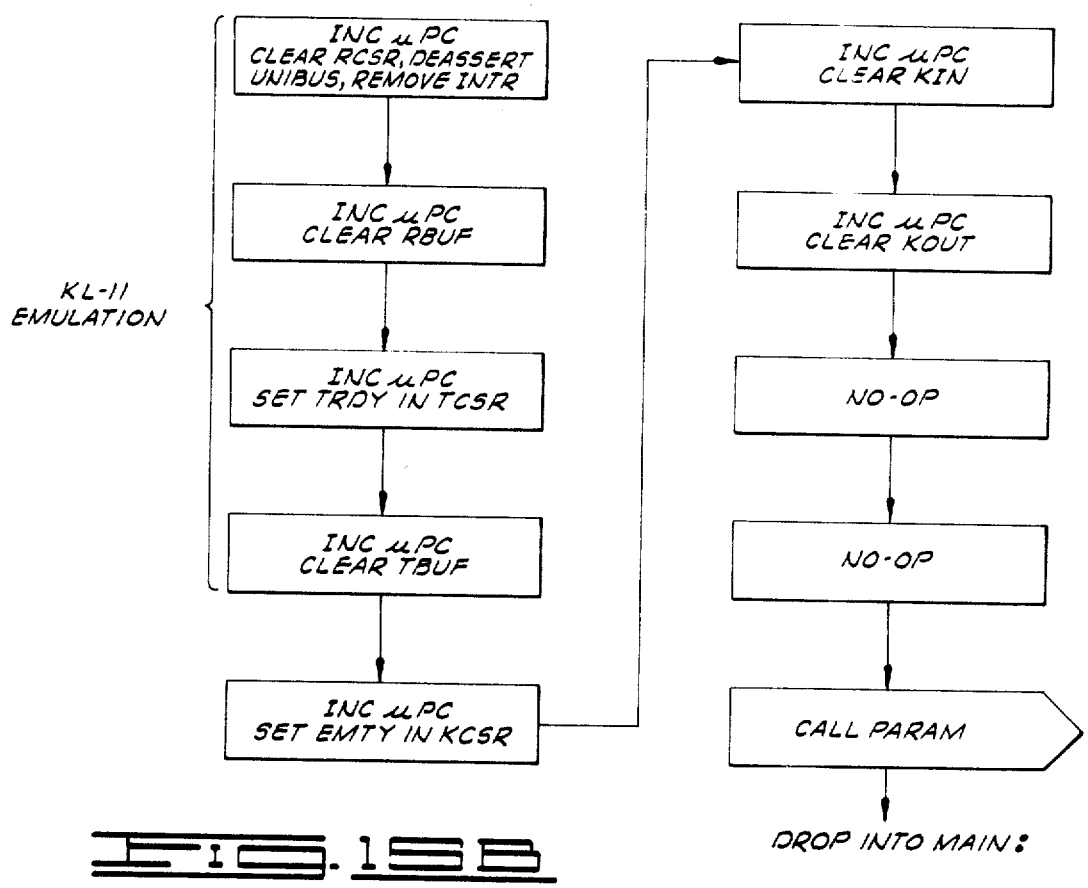
Figure 15A:
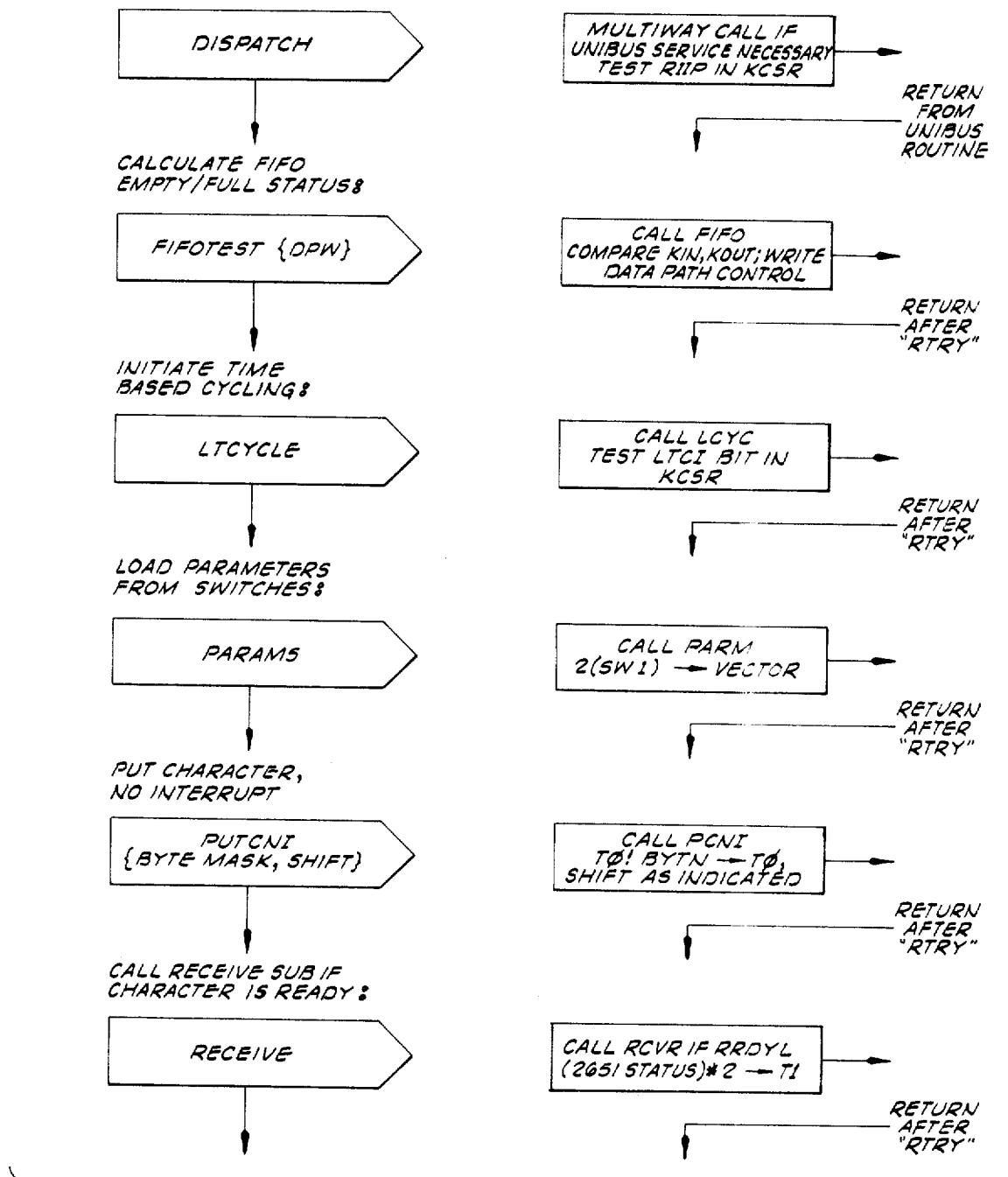
Figure 15C:
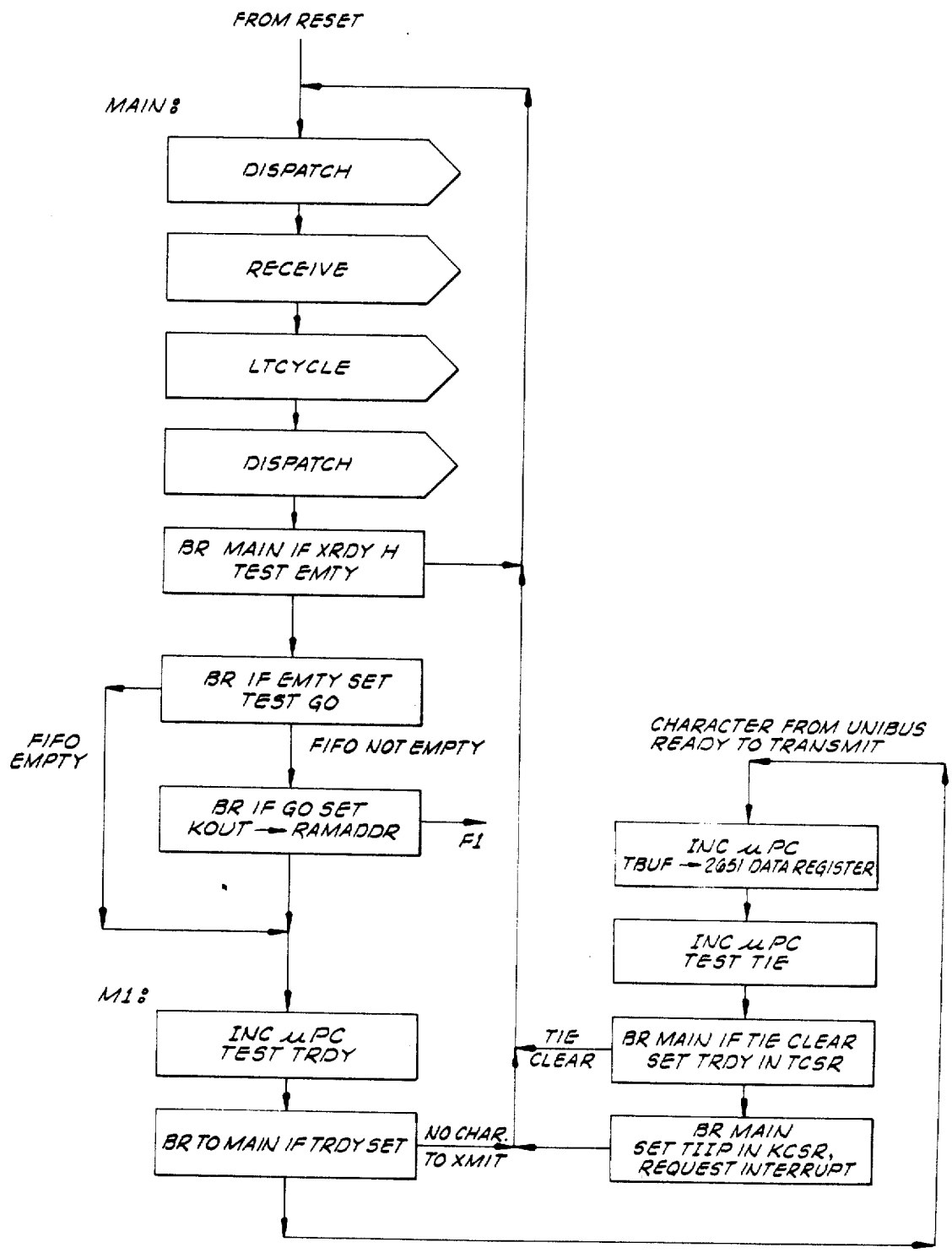
Figure 15D:
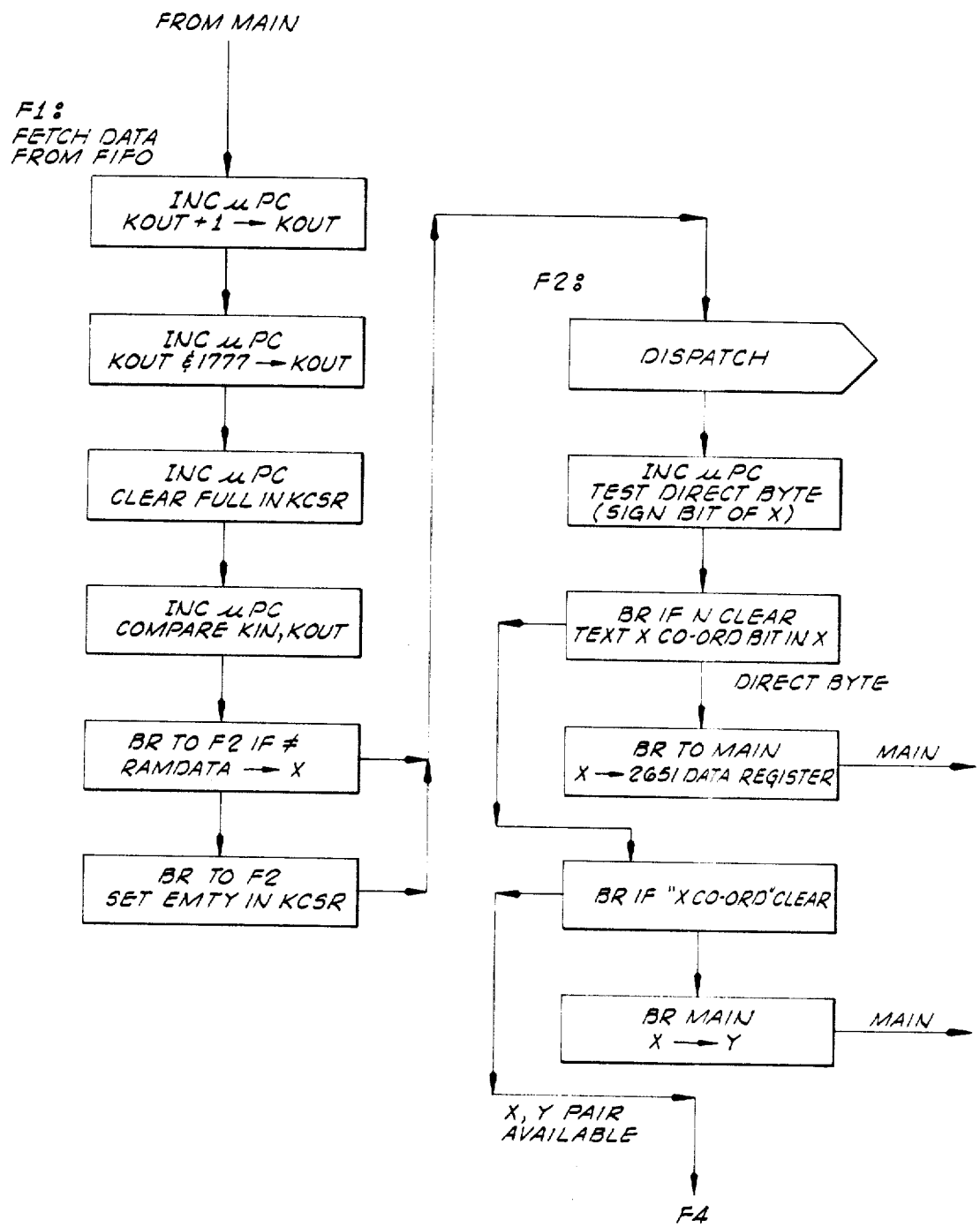
Figure 15E:
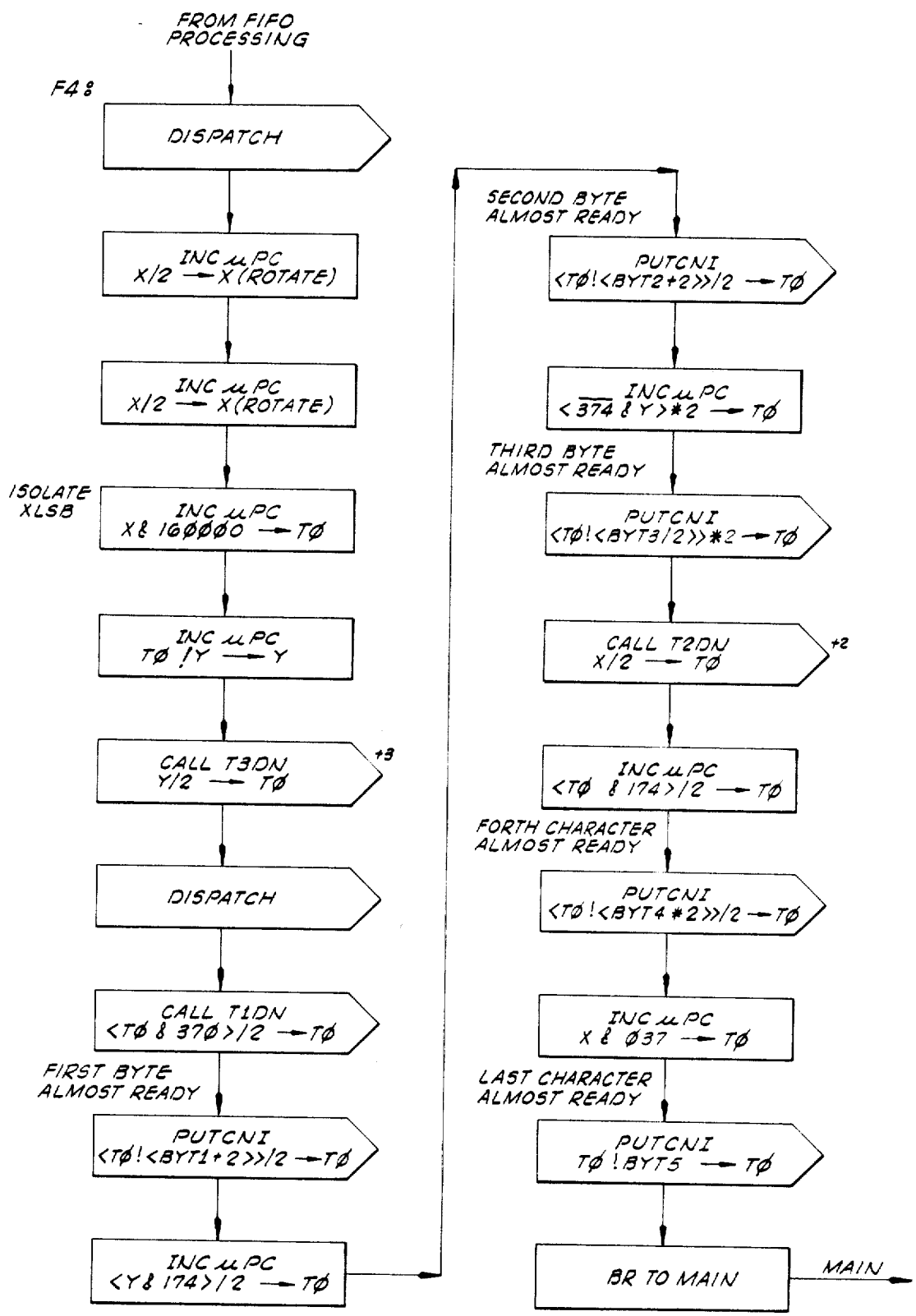
Figure 15H:
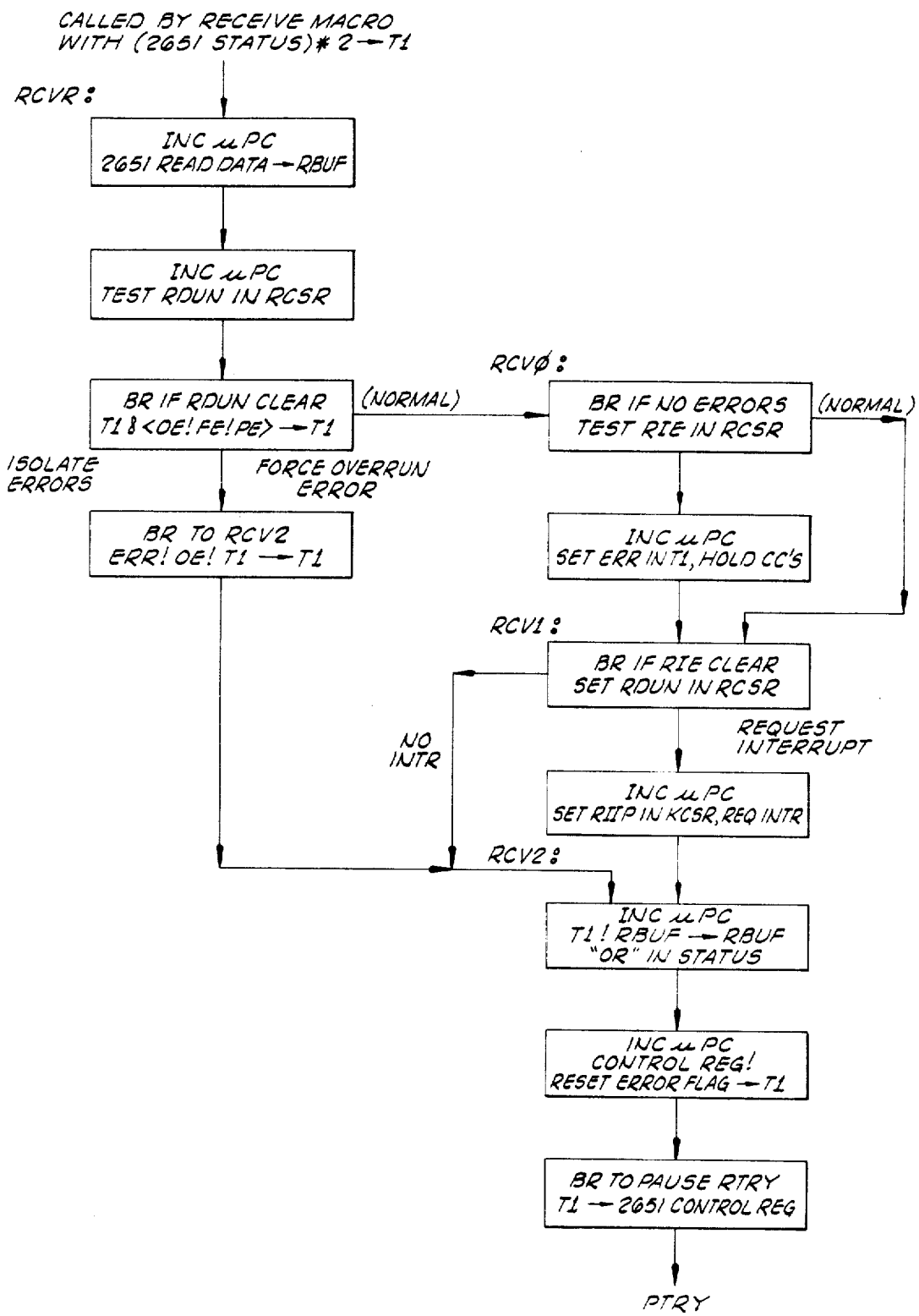
Figure 15I:
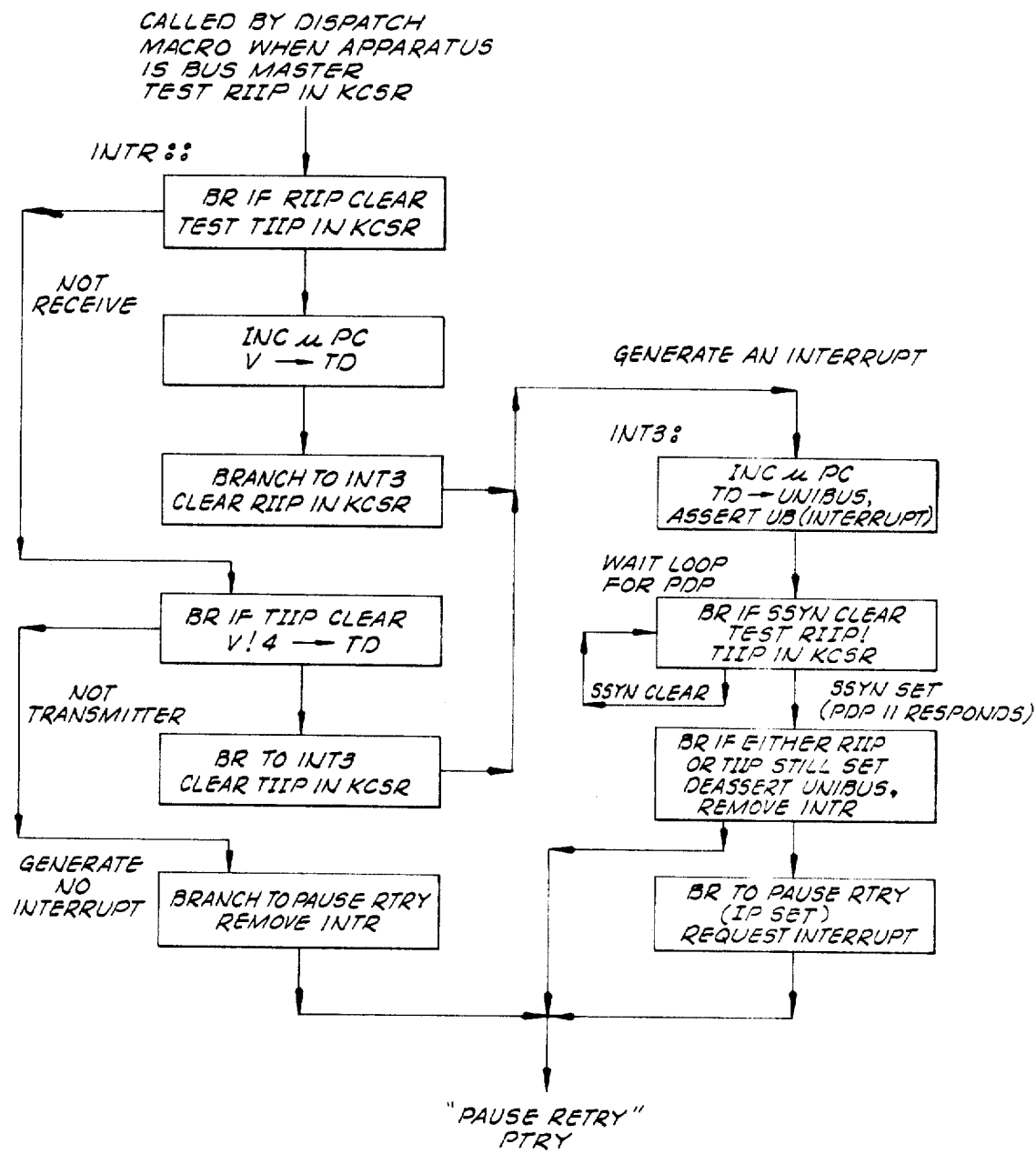
Figure 15J:
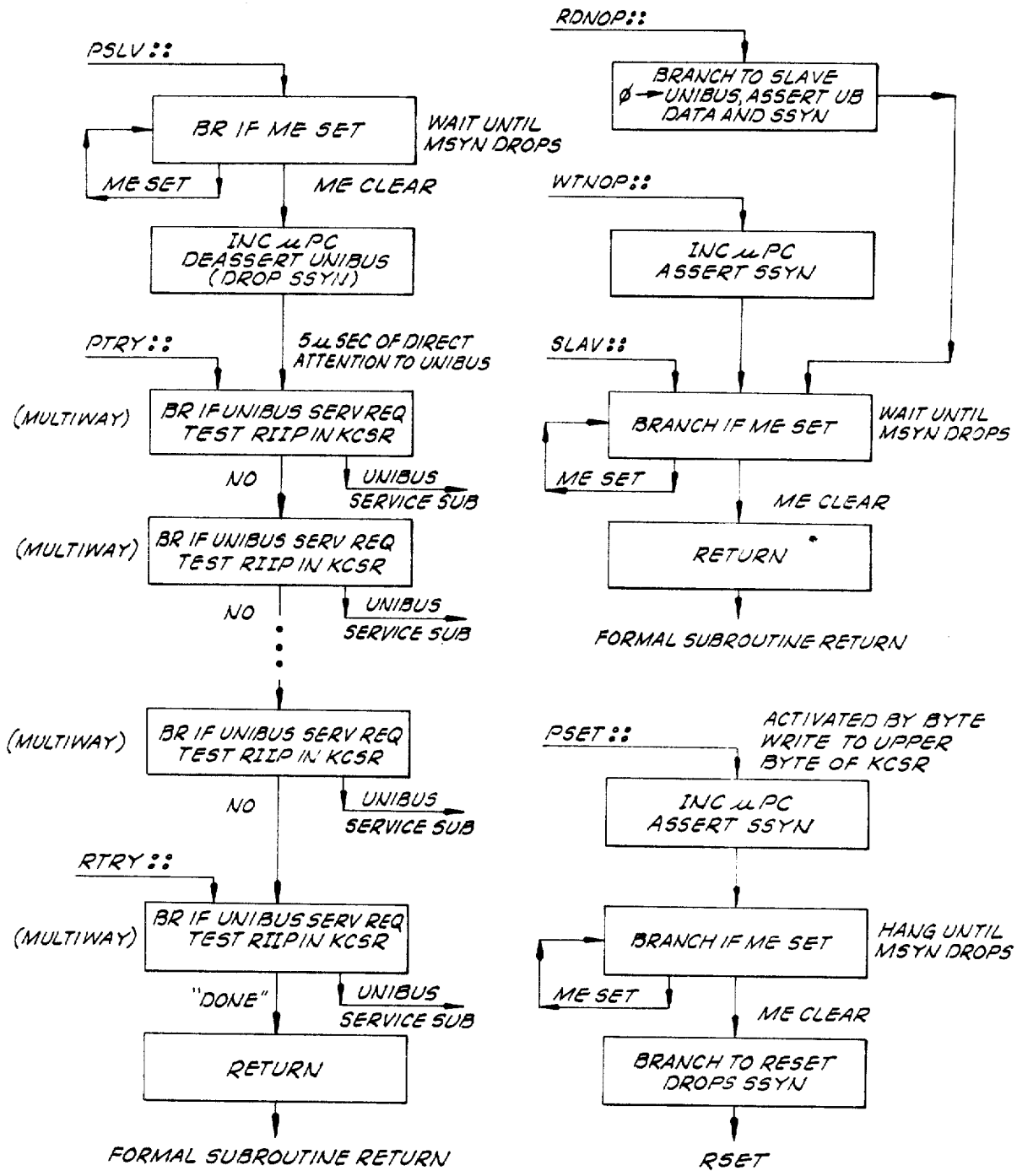
Figure 15K:
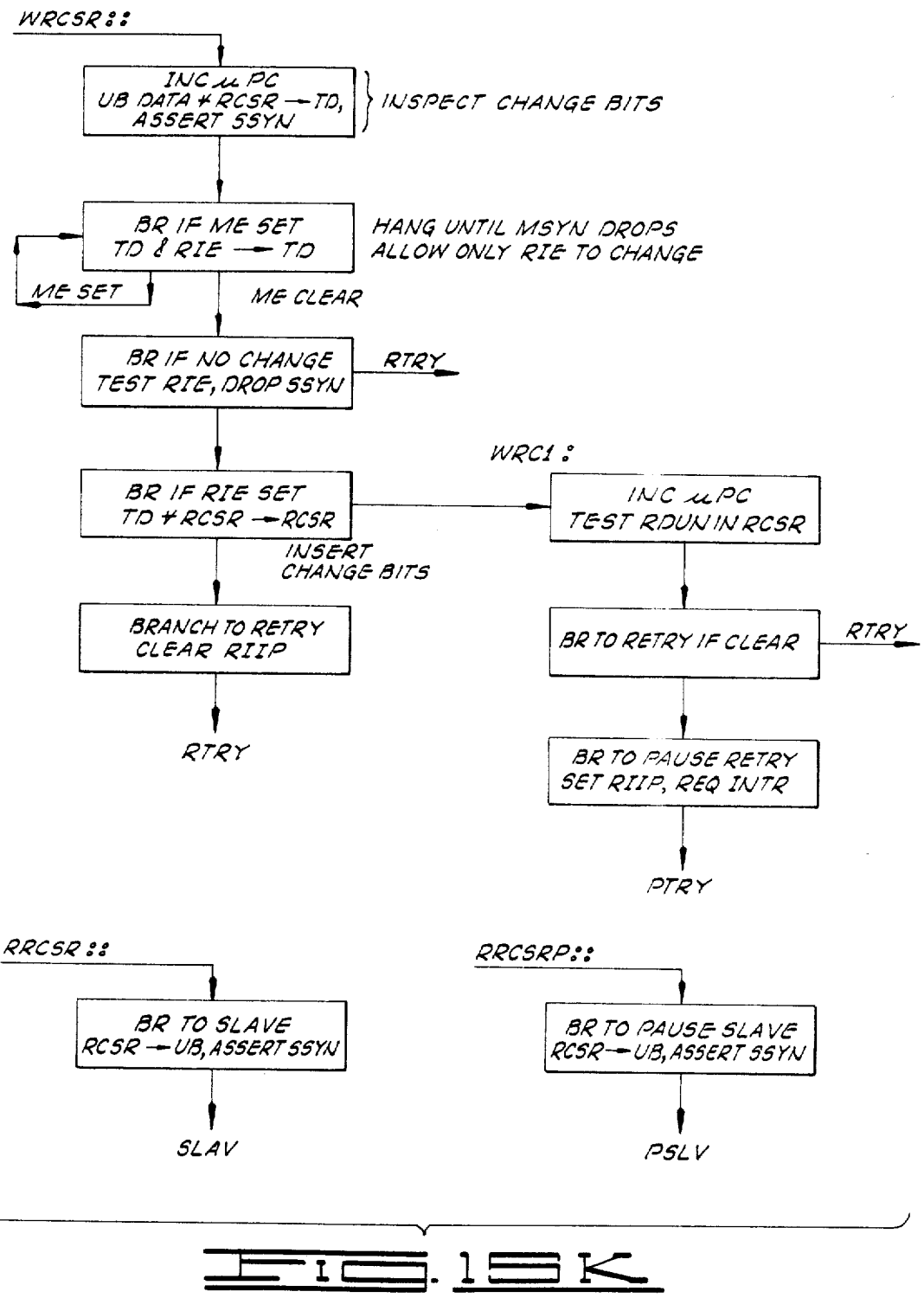
Figure 15L:
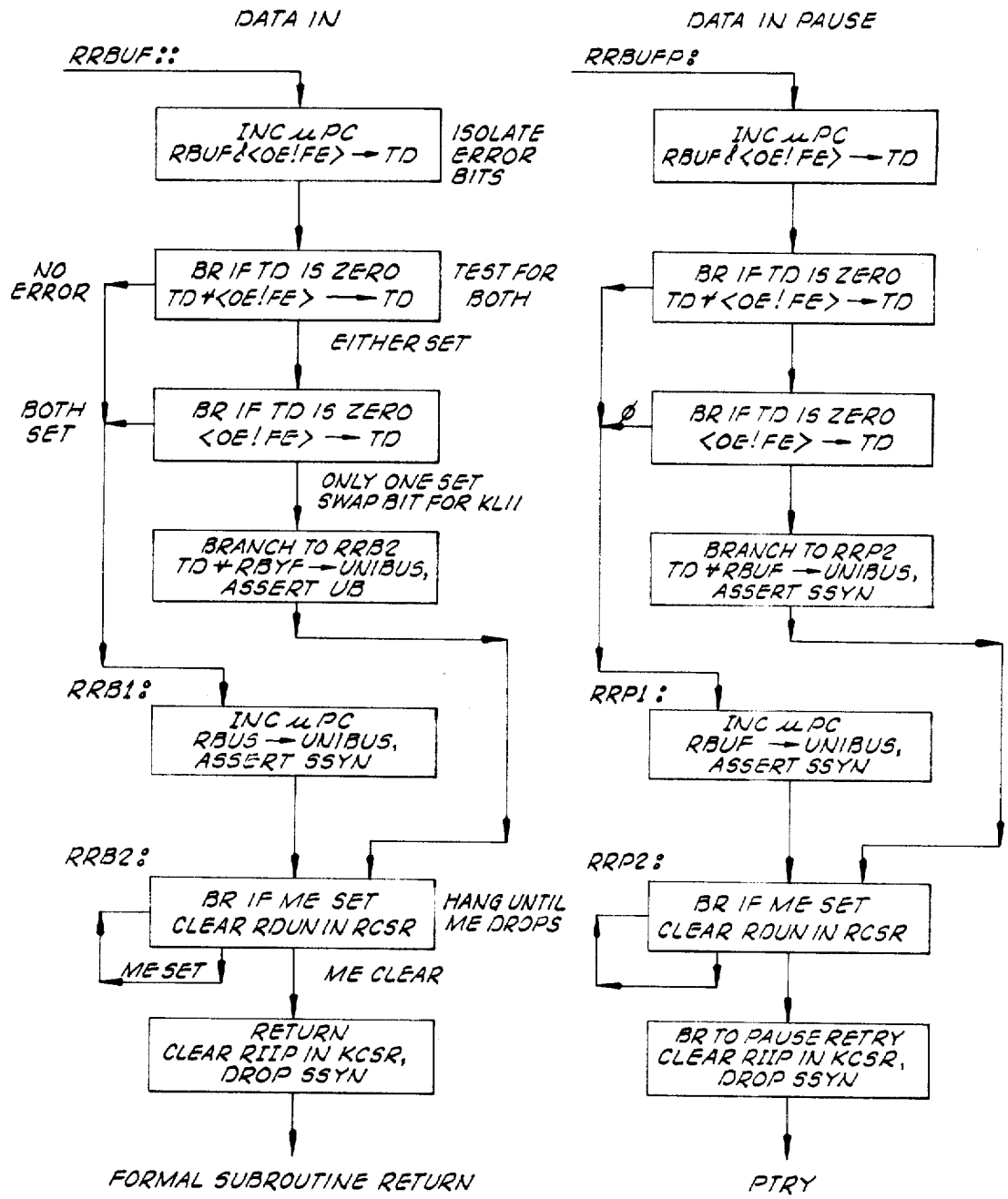
Figure 15M:
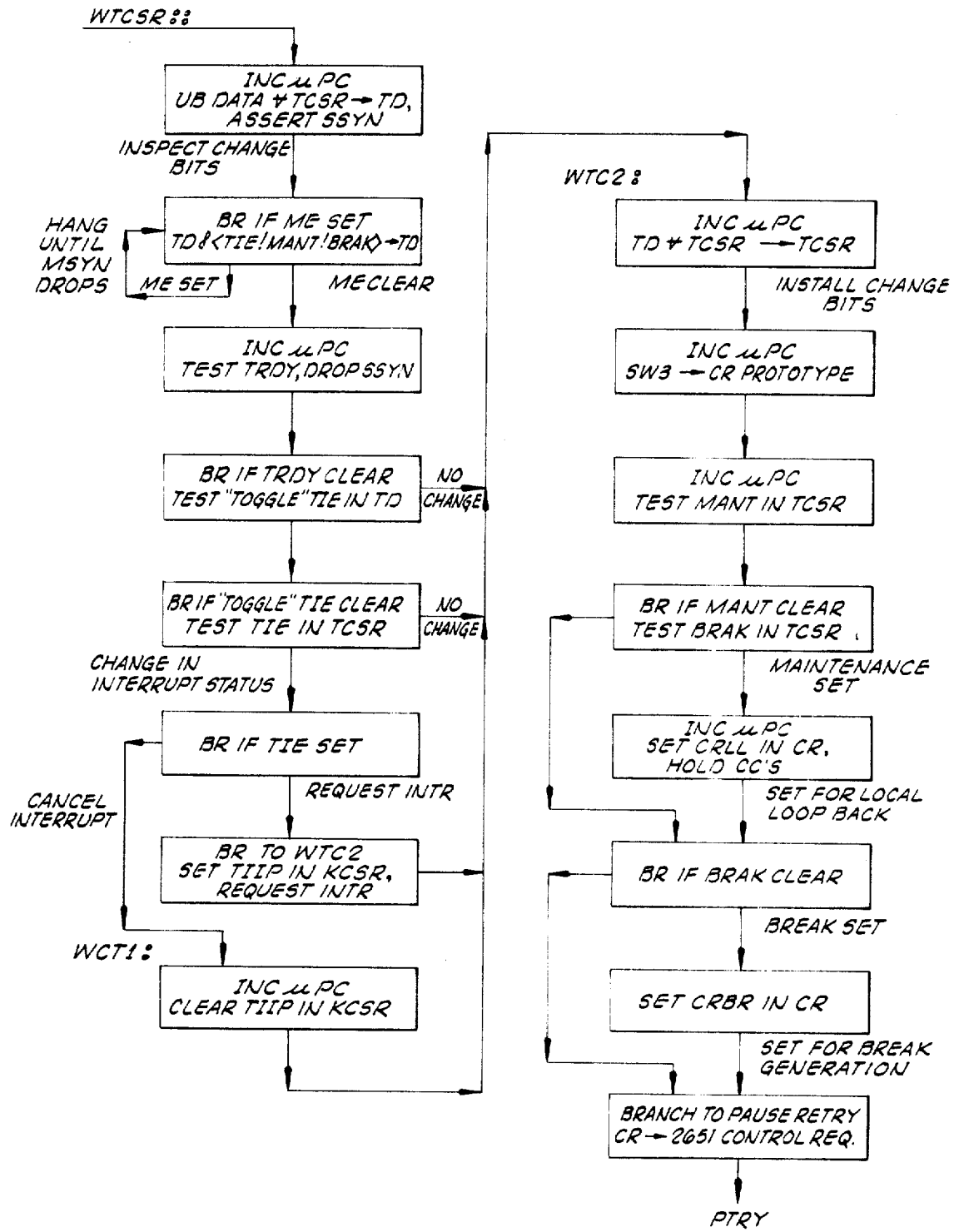
Figure 150:
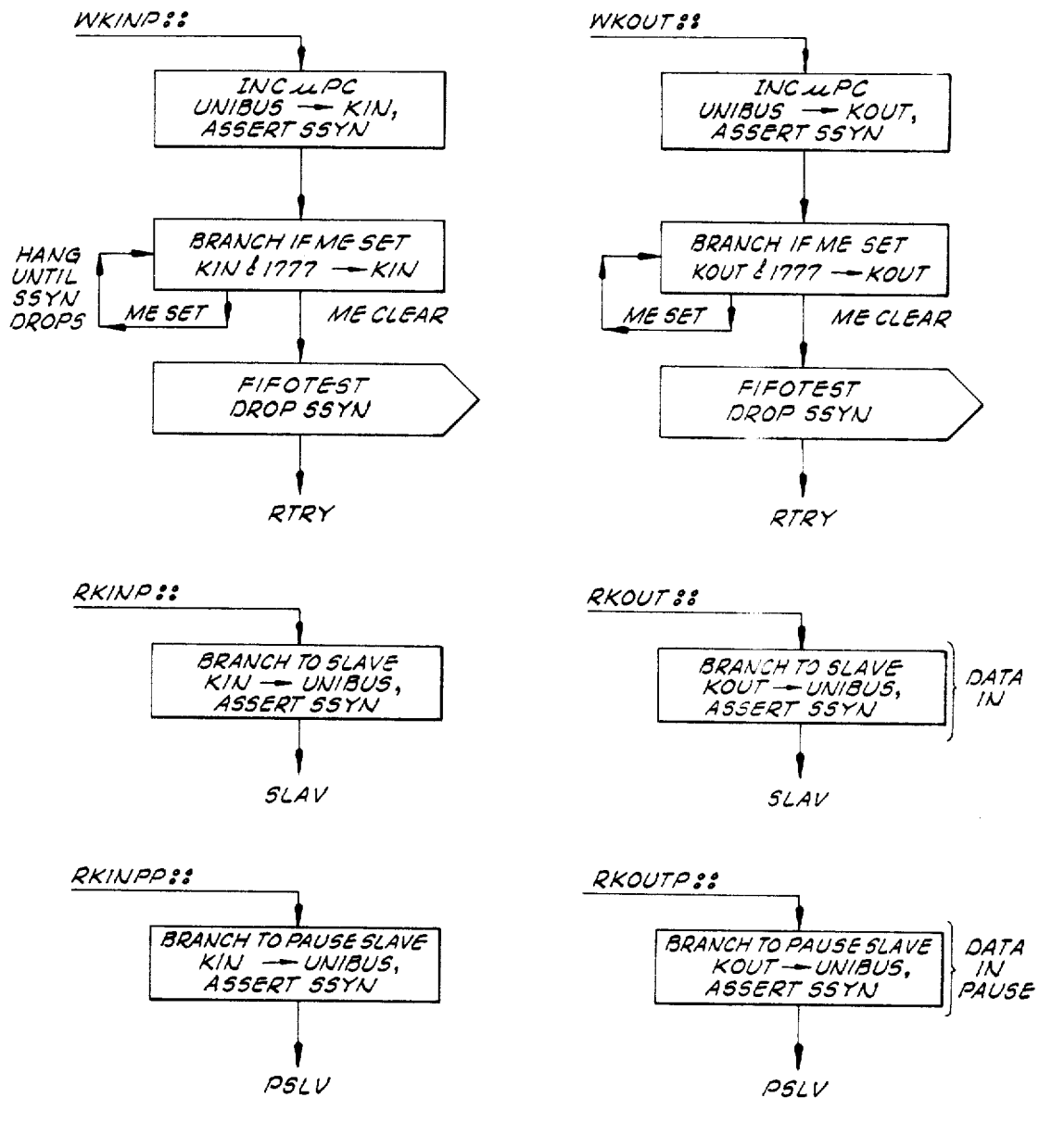
Figure 15P:
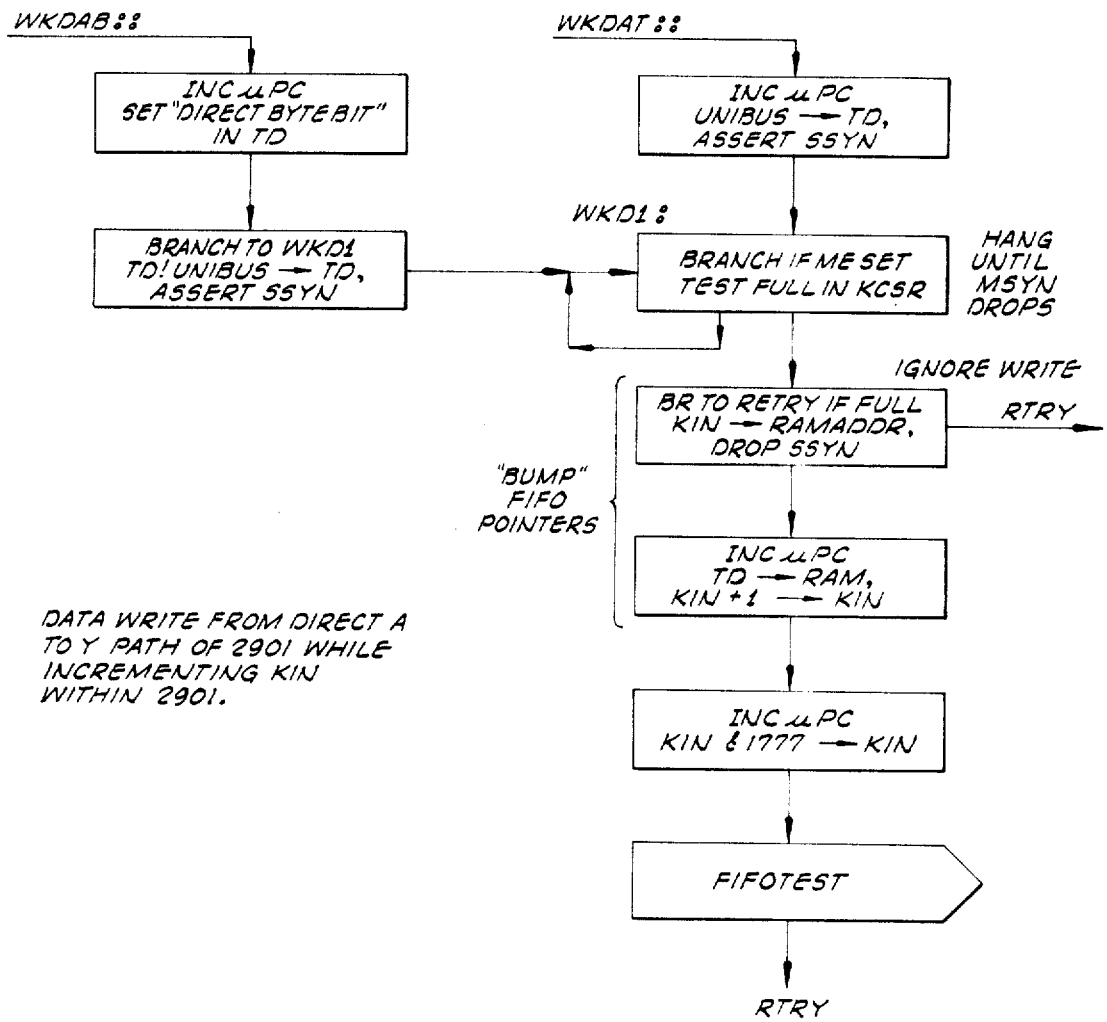
Figure 15Q:
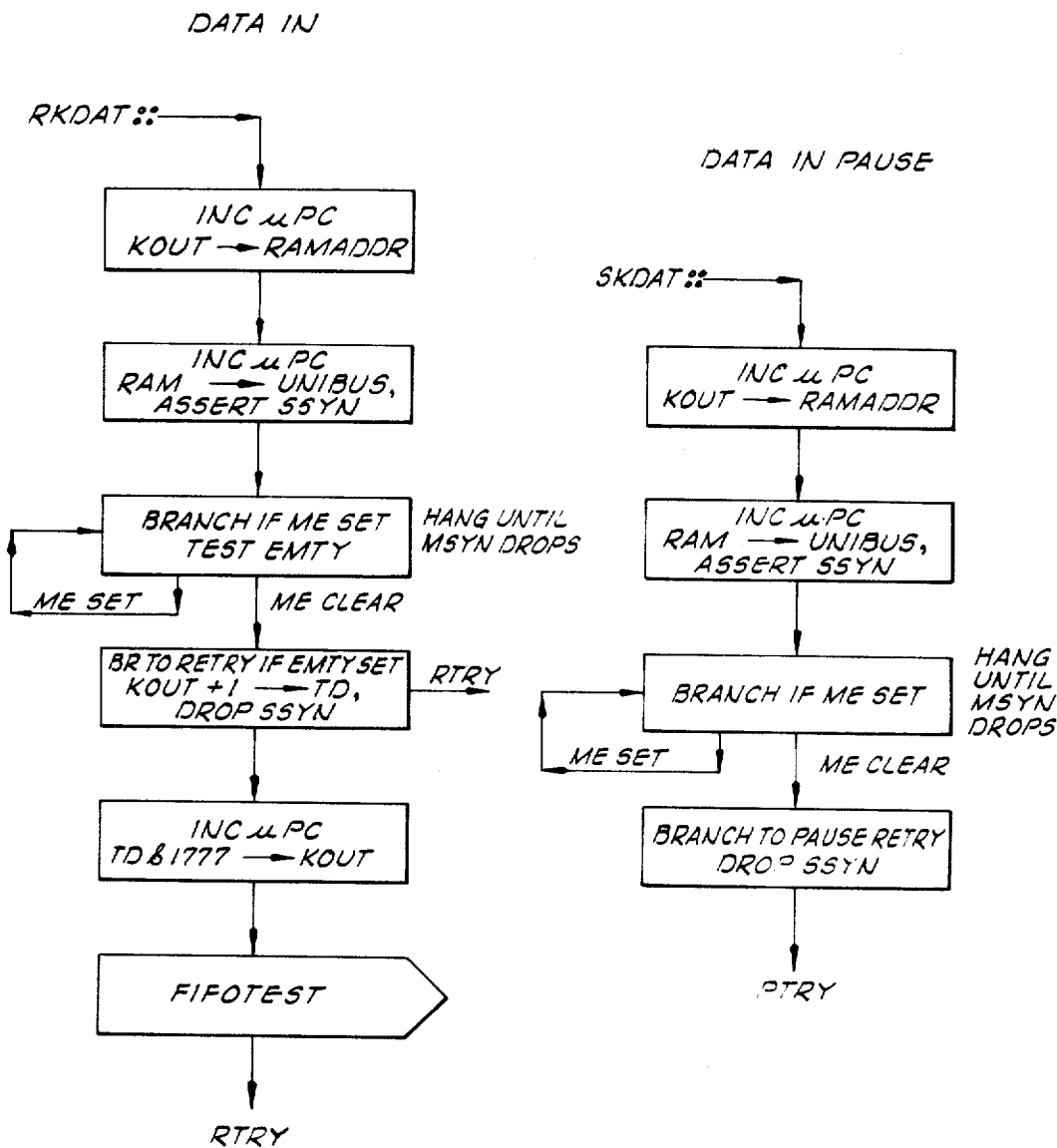

FIGS. 15A-15Q are a flow chart of the program of the embodiment shown in FIG. 1.

With reference to the drawings, the preferred embodiment of the present invention will be described. FIG. 1 discloses a graphics terminal 2 comprising in the preferred embodiment a Tektronix 4010 series graphics terminal, such as a Model 4014 graphics terminal. This particular graphics terminal is capable of receiving information at a rate of approximately 307 kilobaud. This information is received through a serial input means and is displayed on a screen which is illuminable in discrete areas in response to respective groups of data specifying the location of the discrete areas. For the Tektronix device each of the groups of data includes a respective five bytes of binary information. Each byte of this information has seven bits of binary coded information. The Tektronix device includes means for operating in a write-through mode so that images displayed from the screen of the graphics terminal can be moved across the screen without retaining multiple images on the screen.

In the preferred embodiment the graphics terminal 2 responds to information originating in a host computer 4. The host computer 4 utilized with the preferred embodiment of the present invention is a computer having a Unibus data transmission system, such as a Digital Equipment Corporation PDP-11 computer. Such a computer generally operates at a rate of approximately 20 kilobaud to 30 kilobaud. The host computer 4 provides information at this rate through parallel output means over the Unibus data transmission system. The output information is in the form of parallel electrical signals which include electrically coded X coordinates and Y coordinates which select or designate the locations of the discrete areas of the screen of the graphics terminal 2 to be illuminated. For a PDP-11 computer each of these coordinates comprises twelve bits of binary information. The host computer 4 is interfaced with the graphics terminal 2 by means of the present invention identified in FIG. 1 by the reference numeral 6.

The interface 6 has the ability to transmit graphics information to the graphics terminal 2 at speeds substantially higher than the speeds at which conventional systems can transmit such information to a graphics terminal. This speed is achieved, at least in part, by the invention operating its memory as a FIFO buffer, elastically coupling the program producing the X, Y coordinates and their display on the graphics terminal after storage and reformatting. The invention operates simultaneously and in parallel with the host computer 4. The present invention also off-loads the host computer 4 by eliminating the need for the host computer 4 to compute screen coordinates and to perform continuous cyclic data refreshing during the write-through mode. In one mode of operation the present invention emulates the KL-11 serial interface so that the interface 6 operates with the conventional software of a Digital Equipment Corporation PDP-11 computer.

As shown in FIG. 1 the interface 6 includes data path means 8, branch unit means 10, address recognition, state and control means 12, microcode means 14, and clock means 16. Each of these elements is more particularly shown in the remaining figures and more particularly described hereinbelow.

The data path means 8 is more particularly described in FIGS. 2-8. FIG. 2 discloses that the data path means 8 includes a latch means 20 and a register means 22 for interfacing with the data bus of the Unibus system of the host computer 4. The latch means 20 communicates information received over the data bus to an internal data bus 24 which provides an electrical path for interconnecting the elements of the present invention. The register means 22 communicates information from the internal data bus 24 to the data bus of the Unibus system.

The data path means 8 also includes byte swap and select means 26 and register, arithmetic and logic (RALU) means 28. The byte swap and select means 26 and the register, arithmetic and logic means 28 receive twelve-bit X and Y coordinate information over the internal data bus 24 and convert the twelve-bit coordinates into the five seven-bit bytes utilized by the graphics terminal 2.

FIG. 2 also discloses that the data path means 8 includes address register means 30 and random access memory (RAM) means 32. These elements are used for storing information for subsequent high-speed transmission to the graphics terminal 2.

The data path means 8 still further includes serial communication means 34 as shown in FIG. 2. The serial communication means 34 receives parallel information from the internal bus means 24 and serially transmits this information to the graphics terminal 2. The serial communication means 34 of the preferred embodiment is connected to the graphics terminal 2 by means of a coaxial cable because of the high data transmission rates.

The data path means 8 also includes constant input means 36 and program switch bank means 38. These elements are used to hold fixed data and for manually entering information into the present invention.

These elements forming the data path means 8 will be more particularly described with reference to FIGS. 3-8.

Figure 3:
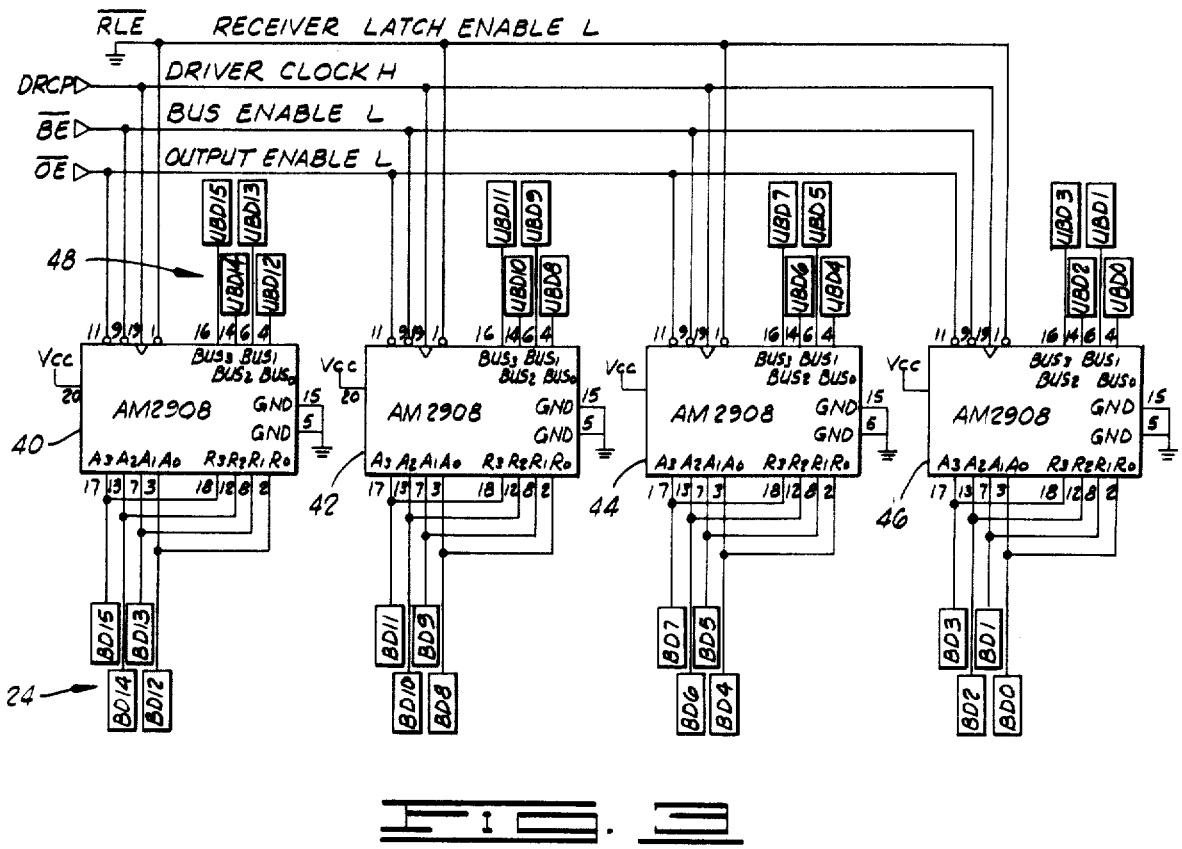
FIG. 3 is a schematic circuit diagram of the Unibus register and latch elements shown in FIG. 2.

The latch means 20 and the register means 22 are shown in FIG. 3 to include four integrated circuit chips 40, 42, 44 and 46 each having four pairs of an input latch and an output latch. Each input latch has its input connected to a respective line of the Unibus data bus, and each corresponding output latch has its output connected to the same line of the Unibus data bus. The Unibus data bus connections are indicated generally by the reference numeral 48. The output of each input latch and the input of each output latch is connected to a respective line of the internal data bus 24.

The input latches provide means for receiving electrically coded information which is sent over the Unibus data bus from the host computer 4. These electrical signals are transferred in parallel over the Unibus data bus and are received in parallel by the sixteen parallel inputs of the receiver means as shown in FIG. 3. These parallel signals are binary signals in the preferred embodiment and form sixteen-bit words. It is through these words that the X and Y coordinates generated by the host computer 4 are transferred to and received by the interface apparatus 6. Each of these sixteen-bit words comprises a first eight bits defined as a first byte and a second eight bits defined as a second binary byte. The first eight bits (first byte) include the lower half of the word, and the second eight bits (second byte) include the upper half of the word.

The byte swap and select means 26 and the register, arithmetic and logic means 28 form a part of a control means which will be described further hereinbelow. The control means is generally used either for transferring the words received through the latch means 20 directly to the graphics terminal 2 if the present invention is operating in a first mode wherein it emulates a KL-11 serial interface or for transferring the words to the random access memory 32 if the present invention is operating in a second mode wherein it stores the words and subsequently converts those words containing X and Y coordinates and transmits them at a high rate of speed to the graphics terminal 2.

The byte swap and select means 26 includes a first multiplexer means 50 and a second multiplexer means 52. The first multiplexer means 50 has a first input channel (designated by the 1A, 2A, 3A and 4A terminals of the right-most two 25LS157 chips shown in FIG. 4) connected so that it can receive the bits of the first bytes of the words stored in the random access memory means 32 when the control means is operating in the second mode. The first multiplexer means 50 also includes a second input channel (designated by the 1B, 2B, 3B and 4B terminals of the right-most two 25LS157 chips shown in FIG. 4) which is connected so that it can receive the bits of the second bytes of the words stored in the random access memory means 32 when the control means is operating in the second mode. The first multiplexer means 50 further includes a first output channel including the individual output lines generally designated in FIG. 4 by the reference numeral 54. The first multiplexer means 50 selectively connects either the first input channel or the second input channel to the first output channel in response to control signals received from other portions of the control means as will be subsequently described hereinbelow.

Figure 4:
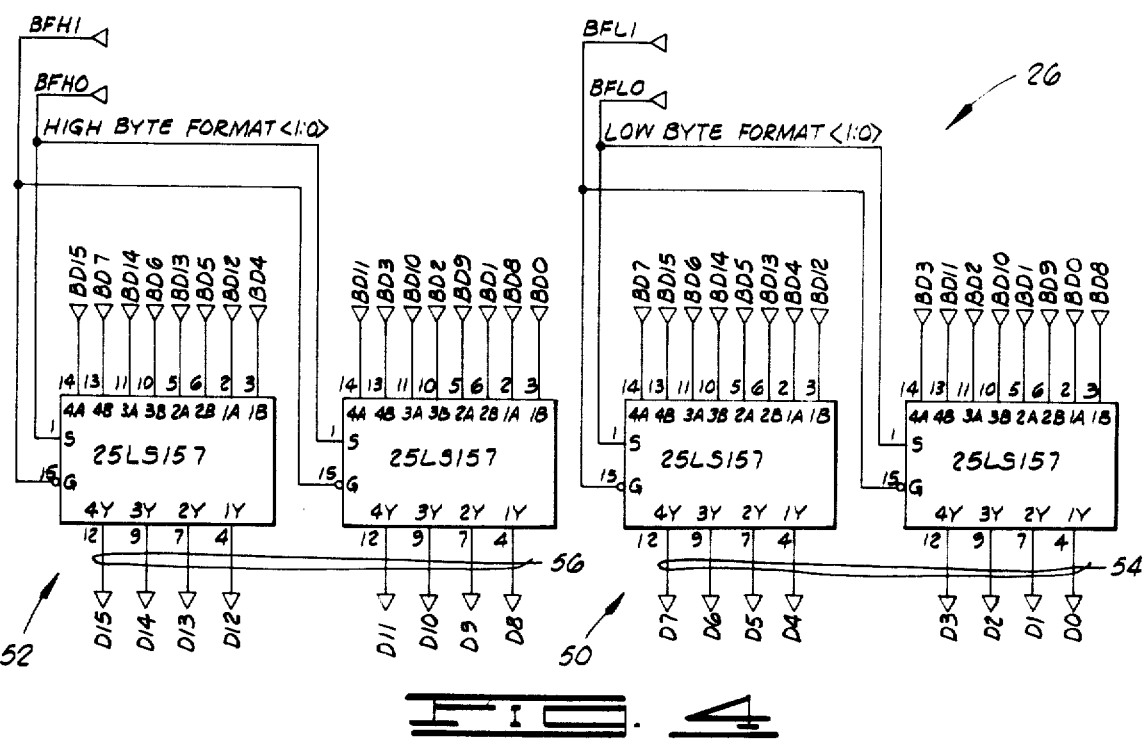
FIG. 4 is a schematic circuit diagram of the byte swap and select element shown in FIG. 2.

The second multiplexer means 52 has a third input channel (designated by the 1A, 2A, 3A and 4A terminals of the left-most two 25LS157 chips shown in FIG. 4) connected so that it can receive the bits of the second bytes of the words stored in the random access memory means 32 when the control means is operating in the second mode. The second multiplexer means 52 also includes a fourth input channel (designated by the 1B, 2B, 3B and 4B terminals of the left-most two 25LS157 chips shown in FIG. 4) connected so that it can receive the bits of the first bytes of the words stored in the random access memory means 32 when the control means is operating in the second mode. Still further, the second multiplexer means 52 includes a second output channel having eight individual output lines identified in FIG. 4 by the reference numeral 56. The second multiplexer means 52 selectively connects either the third input channel or the fourth input channel to the second output channel in response to control signals provided by other portions of the control means. In response to these control signals, the first multiplexer means 50 provides a first multiplexer byte and the second multiplexer means 52 provides a second multiplexer byte of a multiplexer word of information.

It is to be noted that the first input channel of the first multiplexer means 50 receives the lower eight bits of a data word, and the second channel of the first multiplexer 50 receives the upper eight bits of the word. The second multiplexer means 52 has its third input channel connected to receive the upper eight bits of a word and has its fourth input channel connected to receive the lower eight bits of the word.

Figure 5:
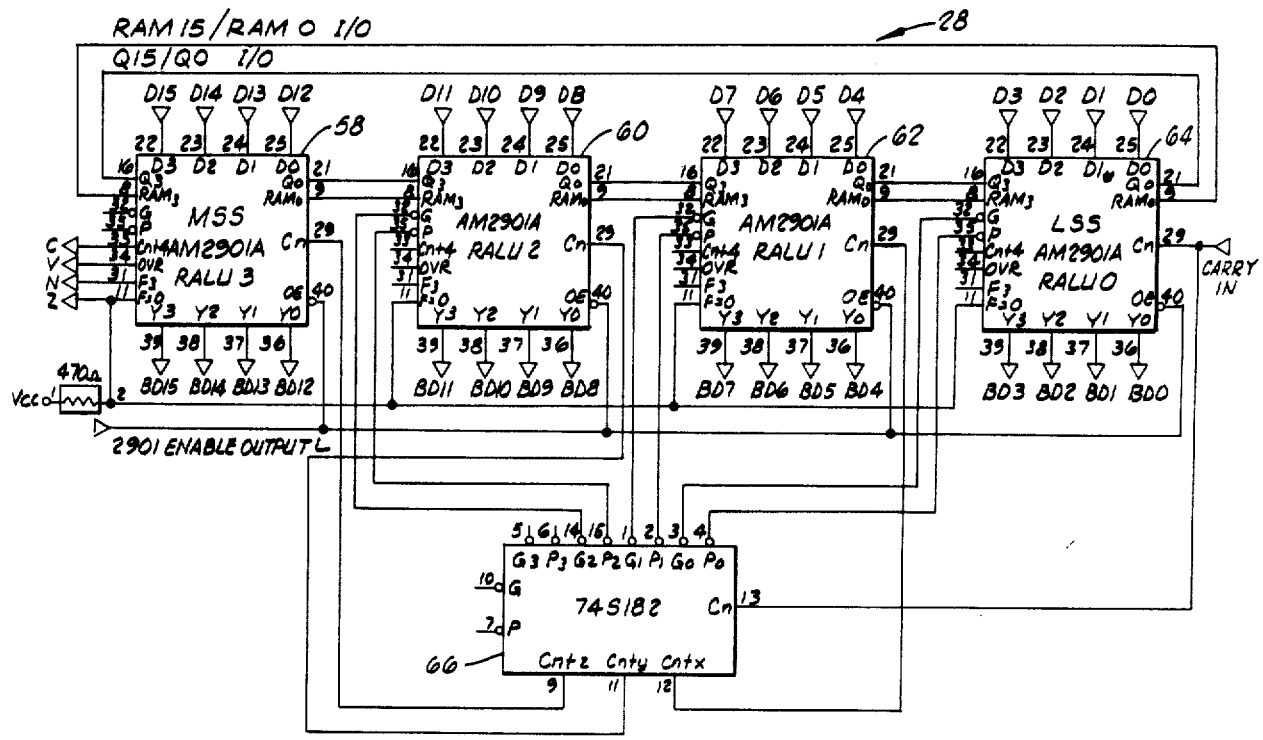
FIG. 5 is a schematic circuit diagram of the RALU element shown in FIG. 2.

FIG. 5 shows that the register, arithmetic and logic means 28 includes a plurality of Advance Micro Devices 2901 integrated circuits. These are identified in FIG. 5 by the reference numerals 58, 60, 62 and 64. These elements are interconnected with a look-ahead carry generator means 66.

Figure 6:
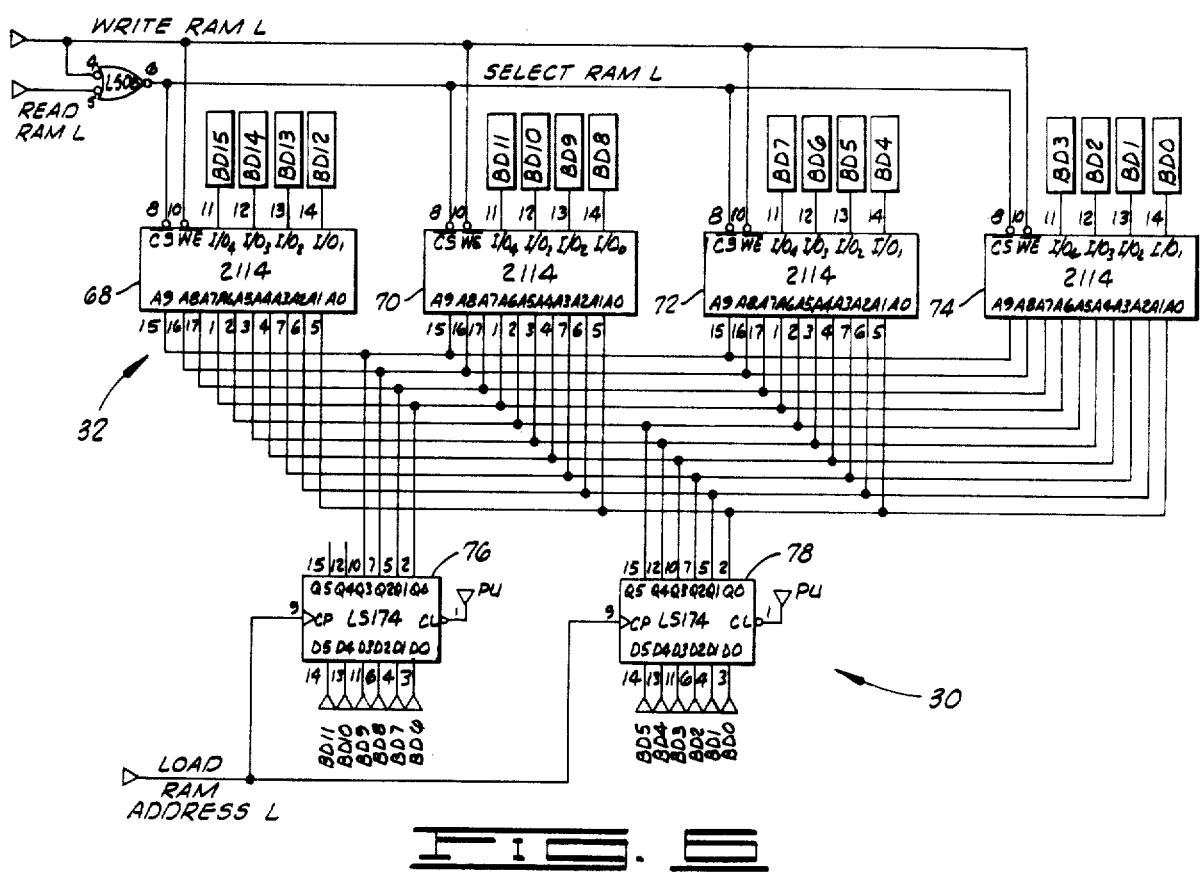
FIG. 6 is a schematic circuit diagram of the address register and random access memory (RAM) elements shown in FIG. 2.

FIG. 6 discloses the schematic circuit diagram of the preferred embodiment of the address register means 30 and the random access memory means 32. These elements provide a storage means having addressable locations where the electrically coded information received from the host computer 4 via the receiver means can be stored. In the preferred embodiment the storage means comprises an electronic storage buffer for electronically storing binary information on a first-in-first-out basis thereby providing a circular buffer. In the preferred embodiment the buffer is comprised of random access memory integrated circuit elements 68, 70, 72 and 74. Access to the individual locations in the random access memory is achieved through latches 76 and 78 forming the address register means 30. In the preferred embodiment the random access memory is capable of holding 1024 words of information wherein each word includes sixteen bits of binary information.

The preferred embodiment of the serial communication means 34 is schematically shown in FIG. 7. The serial communication means 34 includes an integrated circuit receiver transmitter unit 80 having parallel inputs which receive information from the internal data bus 24 through a bus transceiver means 82. The receiver transmitter means 80 is driven by a primary clock means 84. The transmitter and receiver outputs and inputs of the means 80 are connected to the graphics terminal 2 by means of the elements generally identified in FIG. 7 by the reference numeral 86. The receiver transmitter means 80 particularly transmits the groups of five seven-bit bytes of information representing specific locations to be illuminated on the screen of the graphics terminal 2. Other data are also transmitted via the receiver transmitter means 80. The transmission of the groups of five bytes occurs at a rate greater than the rate the host computer 4 would be capable of transferring or throughputting information to the graphics terminal 2 through a standard interface such as is emulated by the present invention when the control means operates the present invention in the first mode.

The constant input means 36 and the program switch bank 38 are disclosed in FIG. 8. The constant input means includes an integrated circuit, identified by the reference numeral 88, capable of receiving an address into inputs 90 and providing constants to the internal data bus by means of outputs 92.

The program switch bank means 38 includes a plurality of switches 94 which are manually actuated and electronically selected by elements 96 for transferal to the internal data bus 24 by means of element 98.

As mentioned hereinabove, the present invention includes control means for transferring the electrically coded information substantially directly to the graphics terminal 2 over the internal data bus means 24 when the control means is in the first mode of operation and for transferring the electrically coded information to the storage means 32 for subsequent high-speed transmission to the graphics terminal 2 over the internal data bus means 24 and the serial communication means 34 when the control means is in the second mode of operation. This control means includes the byte swap and select means 26 and the register, arithmetic and logic means 28. The control means also includes the branch unit means 10, the address recognition, state and control means 12, the microcode means 14, and the clock means 16.

These elements of the control means are configured and programmed to provide low-speed transferal means for transferring at a first rate parallel electrical signals substantially directly between the parallel receiver means comprising the latch means 20 and the serial transmission means 34 when the apparatus is operating in the first mode. The low-speed transferal means gives the present invention the capability of emulating a standard serial interface, such as a KL-11 serial interface.

These elements are also configured and programmed to provide high-speed transferal means for transferring the parallel electrical signals to the circular buffer means provided by the address register means 30 and the random access memory means 32. The high-speed transferal means also subsequently transfers to the serial transmission means 34, at a second rate greater than the aforementioned first rate of the low-speed transferal means, the electrical signals stored in the circular buffer means. The high-speed transferal means includes means for storing each word received from the host computer means 4 in the random access memory means 32. These words include pairs of twelve-bit X and Y coordinates. The high-speed transferal means also includes means for converting each of such pairs of twelve-bit X and Y coordinates into a respective group of five seven-bit bytes which can be used by the graphics terminal means 2. This converting means operates when the control means controls the present invention in the aforementioned second mode. The high-speed transferal means also includes cycle means for retransmitting to the graphics terminal 2 the information stored in the storage means when the graphics terminal 2 is operated in the write-through mode. The cycle means cyclically transfers the data stored in the circular buffer means when the graphics terminal is operating in the write-through mode.

The low-speed transferal means and the high-speed transferal means and their subelements are constructed of the elements disclosed in FIGS. 9–13 as well as of the first multiplexer means 50, the second multiplexer means 52 and the elements of the register, arithmetic and logical means 28. These last three elements are particularly parts of the means for converting the twelve-bit X and Y coordinates into the five seven-bit bytes used by the graphics terminal 2. These last three elements have been described hereinabove, but the remaining elements of the control means will be described with reference to FIGS. 9–13.

The branch unit 10 has a preferred embodiment which is schematically illustrated in FIG. 9. The branch unit 10 includes control elements 100 which receive control signals from the various sources identified by the labels shown in FIG. 9. The control elements 100 select a signal to which a PROM (programmable read only memory) addressing element or sequencer 102 responds to provide a PROM address along a PROM address bus means 104. As shown in FIG. 1 the control signals originate as branch control signals and condition codes received from the data path means 8, the address recognition, state and control means 12, and the microcode means 14. The branch address and special branch address signals shown in FIG. 1 to be provided to the branch unit means 10 are provided at an input means 106 illustrated in FIG. 9. By controlling the branch unit means 10, the operation of the present invention can be controlled because the instruction address provided to the microcode means 14 is provided through the branch unit means 10 as illustrated in FIG. 1.

Figure 11:
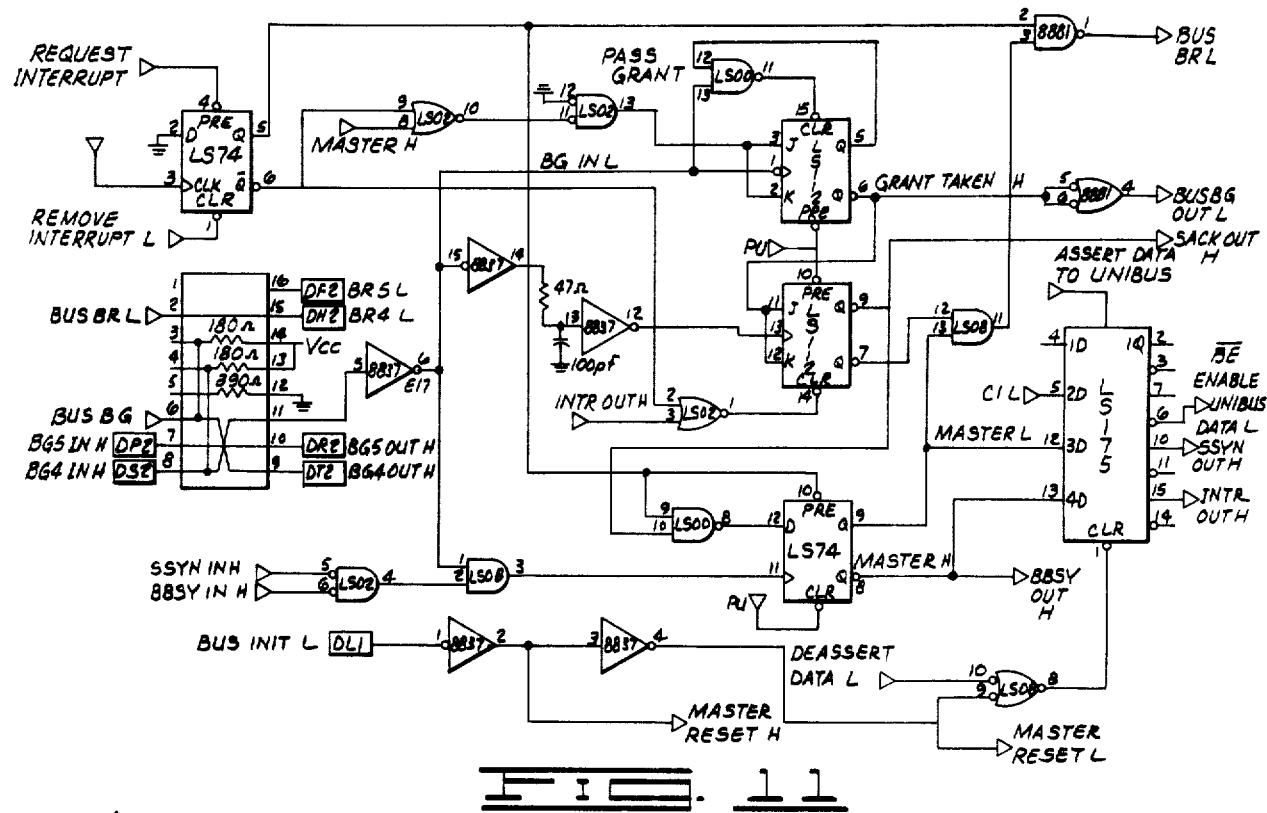
FIG. 11 is a schematic circuit diagram of the state and control portion of the embodiment shown in FIG. 1.

The address recognition, state and control means 12 includes the elements shown in FIGS. 10 and 11. The address of a particular one of the interface devices 6 constructed in accordance with the present invention is selected by switch means 108.

The special branch address shown in FIG. 1 passing from the means 12 is specifically provided by the elements identified in FIG. 10 by the reference numeral 110. The input to these elements is received over Unibus address lines 112.

Other control elements which produce signals for interacting with the Unibus are identified in FIGS. 10 and 11 as will be understood by those skilled in the art.

The microcode means 14 is illustrated in its preferred embodiment in FIGS. 12A-12B. The microcode means 14 includes a plurality of programmable read only memory integrated circuits which are addressed over the PROM address bus 104. Each of the PROMS provides a number of instructions as indicated by the labeling shown in FIGS. 12A-12B. Stored within the memory cells of the PROMS of the microcode means 14 are the steps of the program which is utilized to control the operation of the present invention. A flow chart of this program is set forth in FIGS. 15A-15Q. It is noted that FIG. 12B discloses a diagnostic socket means 114. The diagnostic socket means 114 is utilized to manually control the present invention to test its operation.

The control means of the interface 6 also includes the clock means 16 which is particularly disclosed in its preferred embodiment in FIG. 13. The clock means 16 controls the major clocking states of the interface 6. These elements and their interconnections will be readily apparent to those having skill in the art.

It is to be noted that the specific values and model numbers disclosed in the drawings forming a part of this disclosure are for purposes of disclosing the preferred embodiment of the present invention and are not to be taken as limiting the present invention. Additionally, it is to be noted that interconnections between elements shown in different drawings are indicated by similar labels.

During its operation, the interface 6 receives sixteen-bit words over the Unibus data bus from the host computer 4. These words include control characters, direct data, and twelve-bit X and Y coordinates which are to be used to select and display images on the screen of the graphics terminal 2. These words are provided over the Unibus data bus for reception by the receiver means which includes the latch means 20.

The control means of the interface 6 responds to control characters contained within the words transferred over the Unibus data bus to the interface 6. These control characters can either place the interface 6 in a first mode wherein the words from the computer 4 are to be transferred substantially directly to the graphics terminal 2 or place the interface 6 in a second mode wherein the words are to be stored in the random access memory 32 for subsequent conversion and transmission to the graphics terminal 2. In the preferred embodiment the mode is selected by which of eight registers is or are addressed and manipulated by words transferred over the Unibus data bus. These eight registers (which are referred to in FIG. 15B, for example) include RCSR, RBUF, TCSR, TBUF, KCSR, KIN (in-pointer), KOUT (out-pointer) and a data register. The first four of these permit KL-11 emulation and the second four permit the reformatting of the X and Y coordinates.

If the interface 6 is placed in the first mode, the words from the host computer 4 are received by the latch means 20 and transferred from the latch means 20 over the internal data bus means 24 to the serial communication means 34 for serial transmission to the graphics terminal 2. In this mode the present invention emulates a standard serial interface, such as a Digital Equipment Corporation KL-11.

If the interface 6 is placed in the second mode, each of the words received by the latch means 20 is transferred over the internal data bus means 24 to the random access memory means 32. Upon a suitable command, such as from the host computer 4, or upon receiving a synchronizing 60 Hz. clock signal from the host computer 4, the words contained within the random access memory 32 are circularly read therefrom on a first-in, first-out basis (it is to be noted that the synchronization of the interface with the host computer by means of the 60 Hz. signal enables the interface to reformat and transmit its internal buffer to the terminal without intervention by the host computer). As the words are read from the random access memory 32, direct data is transmitted directly to the graphics terminal through the serial communication means 34. However, words contained within the random access memory 32 representing X and Y coordinates calculated by the host computer 4 are transferred to the byte swap and select means 26 to initiate a conversion process whereby each pair of X and Y coordinates is converted into a group of five seven-bit bytes which are comprehendible by the graphics terminal 2 for displaying graphic information on the screen thereof. Generally, the byte swap and select means 26 is used to present bytes alone or in duplicate to the register, arithmetic and logic means 28 for a reformatting operation. Reformatting proceeds and intermediate bytes are logically ORed with constants to build data comprehendible by the Tektronix 4014 graphics terminal in the preferred embodiment. More particularly, when the byte swap and select means 26 receives an X coordinate, the means 26 multiplexes the coordinate as a first lower eight bits and a first upper four bits through the first multiplexer means 50 and the second multiplexer means 52. Likewise, a Y coordinate is multiplexed as a second lower eight bits and a second upper four bits. These groupings of coordinate bits can be swapped in their order within the respective word through the multiplexer means 50 and 52 by connecting either the first or second channel of the first multiplexer means 50 to the output thereof or by connecting the third or fourth input channels of the second multiplexer means 52 to the respective output thereof.

Once the X and Y coordinate words have been suitably multiplexed, they are converted into five seven-bit bytes of binary information in the register, arithmetic and logical means 28. This conversion from two twelve-bit words to five seven-bit bytes is illustrated in FIG. 14.

The resultant group of five seven-bit bytes is transferred over the internal bus means 24 for transmission to the graphics terminal via the serial communication means 34.

Through this operation, which occurs simultaneously and in parallel with the host computer 4, the interface 6 of the present invention is able to transmit graphics information to the graphics terminal at extremely high speeds. Because the host computer 4 typically produces coordinates at an uneven rate, the interface 6 operates its memory as a FIFO buffer to elastically couple the host computer's program producing the coordinates and their display on the graphics terminal 2. The interface 6 eliminates the need for having the host computer 4 compute screen coordinates and perform continuous cyclic data refreshing during a write-through mode. The host computer 4 does not need to perform the refreshing cycle because the interface 6 can be operated to cyclically convert and transfer the information contained in the random access memory 32 to the graphics terminal 2, synchronized by the power line frequency (typically 60 Hz.). The interface 6 also is capable of emulating a standard serial interface, such as the KL-11, so that it is compatible with computer systems having Unibus data transmission systems.

Thus, the present invention is well adapted to carry out the objects and attain the ends and advantages mentioned above as well as those inherent therein. While a preferred embodiment of the invention has been described for the purpose of this disclosure, numerous changes in the construction and arrangement of parts can be made by those skilled in the art, which changes are encompassed within the spirit of this invention as defined by the appended claims.

What is claimed is:

1. An interface apparatus for increasing speed of throughput of information between a host computer, having an output and means for transferring at a first rate to the output information containing control signals and pairs of twelve-bit X and Y coordinates, and a Tektronix graphics terminal, having means for receiving input information at a second rate which is approximately ten times greater than the first rate at which the information is transferred from said host computer, said apparatus comprising:

latch means, externally connected to the output of said host computer, for receiving from said host computer the output information containing pairs of twelve-bit X and Y coordinates;

electronic storage buffer means, connected to said latch means externally of said host computer, for electronically storing binary information;

means, connected with said storage buffer means externally of said host computer and responsive to the control signals from said host computer, for storing in said storage buffer means each pair of twelve-bit X and Y coordinates received by said latch means;

converting means, connected to said storage buffer means externally of said host computer, for converting each pair of twelve-bit X and Y coordinates stored in said storage buffer means into a respective group of five seven-bits bytes; and means, connected to said converting means externally of said host computer and connectible to said graphics terminal, for serially sending to said graphics terminal, at a rate greater than said first rate but not greater than said second rate, the groups of five seven-bit bytes.

2. An apparatus for providing a high-speed interface between a host computer, having a Unibus data transferal system, and a Tektronix 4010 series graphics terminal, said apparatus comprising:

internal bus means for providing internal communication paths within said apparatus;

latch means, having inputs connected to said Unibus data transferal system and having outputs connected to said internal bus means, for receiving words of data transferred over the Unibus data transferal system, said words of data including an X coordinate and a Y coordinate, each coordinate being defined by twelve binary bits within a respective word of data and a word of data having a coordinate defined therein including a first byte and a second byte;

memory means, having inputs and outputs connected to said internal bus means, for storing the first and second bytes of said X and Y coordinates;

first multiplexer means, having a first input channel connected to a first portion of said internal bus means to receive each said first byte stored in said memory means, a second input channel connected to a second portion of said internal bus means to receive each said second byte stored in said memory means, and a first output channel, for selectably connecting either said first input channel or said second input channel to said first output channel, said first output channel providing a selectable first multiplexer byte for each of a plurality of multiplexer words of information;

second multiplexer means, having a third input channel connected to said second portion of said internal bus means to receive each said second byte stored in said memory means, a fourth input channel connected to said first portion of said internal bus means to receive each said first byte stored in said memory means, and a second output channel, for selectably connecting either said third input channel or said fourth input channel to said second output channel, said output channel providing a selectable second multiplexer byte for each of said plurality of multiplexer words of information;

electronic arithmetic and logic means, having inputs connected to said first output channel and said second output channel and having outputs connected to said internal bus means, for receiving said multiplexer words and for converting those multiplexer words containing binary bits defining a pair of said X and Y coordinates into five seven-bit bytes of binary information;

serial transmission means, connected to said internal bus means, for receiving said five seven-bit bytes of binary information from said electronic arithmetic and logic means and for serially transmitting said five seven-bit bytes to said Tektronix graphics terminal; and control means, connected to said Unibus data transferal system and connected to said first and second multiplexer means, for controlling said first and second multiplexer means to define which one of said first and second bytes from said memory means constitutes said first multiplexer byte and which one of said first and second bytes from said memory constitutes said second multiplexer byte.

3. An apparatus for interfacing a host computer, having means for generating parallel electrical signals representing control characters and representing display illumination information defined by a twelve-bit X coordinate and a twelve-bit Y coordinate and having a parallel output means including a Unibus data transferal system for outputting the twelve-bit X and Y coordinates, with a graphics terminal, having a serial input means for receiving display illumination information defined by five seven-bit bytes, said apparatus comprising:

parallel receiver means, directly connected to the Unibus data transferal system, for receiving the parallel electrical signals provided by the host computer through the parallel output means;

serial transmission means for sending serial electrical signals from said apparatus to the graphics terminal;

storage means for providing an addressable memory within said apparatus;

control means, responsive to the control characters defined within the parallel electrical signals, for operating said apparatus in either a first mode or a second mode, said control means including:

low-speed transferal means for transferring the parallel electrical signals at a first rate directly between said parallel receiver means and said serial transmission means without storing such signals in said storage means when said apparatus is operating in the first mode; and high-speed transferal means for transferring the parallel electrical signals including the twelve-bit X coordinate and the twelve-bit Y coordinate to said storage means and for subsequently converting the X coordinate and the Y coordinate into a group of five seven-bit bytes and transferring to said serial transmission means, at a second rate greater than the first rate of said low-speed transferral means, the group of five seven-bit bytes for high-speed serial transmission to the graphics terminal, said high-speed transferal means including:

first multiplexer means, having a first input channel connected to said storage means for receiving a first group of bits within either the X coordinate or the Y coordinate from said storage means, a second input channel connected to said storage means for receiving a second group of bits of the X coordinate or the Y coordinate from said storage means, and a first output channel, for selectively connecting either said first input channel or said second input channel to said first output channel, said first output channel providing a first multiplexer byte of a multiplexer word of information, said first multiplexer byte comprising a selected one of said first and second group of bits;

second multiplexer means, having a third input channel connected to said storage means for receiving said second group of bits of the X coordinate or the Y coordinate from said storage means, a fourth input channel connected to said storage means for receiving said first group of bits of the X coordinate or the Y coordinate from said storage means, and a second output channel, for selectively connecting either said third input channel or said fourth input channel to said second output channel, said second output channel providing a second multiplexer byte of said multiplexer word of information, said second multiplexer byte comprising a selected one of said second and first group of bits; and electronic register, arithmetic and logic means connected to said first and second output channels for receiving said multiplexer words and for converting those multiplexer words containing binary bits defining the X coordinate and the Y coordinate into five seven-bit bytes of information to be received by the graphics terminal; and internal bus means for connecting said parallel receiver means, said serial transmission means, said storage means, and said control means.

4. An apparatus as defined in claim 3, wherein said high-speed transferal means further includes means for cyclically transferring to the graphics terminal said five seven-bit bytes of information so that the graphics terminal is operated in a write-through mode wherein the display illumination information is continuously recycled to the graphics terminal.

5. An apparatus as defined in claim 3, wherein said storage means includes circular buffer means for providing a first-in, first-out buffer for elastically coupling the host computer and the graphics terminal.

6. An interface apparatus for increasing speed of throughput of information between a host computer, having a parallel output bus over which display information in form of two-word pairs of X and Y coordinates is provided at a first rate and having means for providing control signals, and a graphics terminal, having a serial input for receiving at a second rate greater than the first rate display information in the form of groups of greater than two bytes, said interface apparatus comprising:

data path means, including:

internal bus means for providing internal communcation paths;

latch means, having parallel inputs connected to the parallel output bus of the host computer and having parallel outputs connected to said internal bus means, for receiving the X and Y coordinates from the host computer;

register means, having parallel inputs connected to said internal bus means and having parallel outputs connected to the parallel output bus of the host computer, for communicating information to the host computer;

address register means, connected to said internal bus means, for receiving a memory address over said internal bus means;

memory means, connected to said address register means and said internal bus means and responsive to said memory address, for storing at least some of the X and Y coordinates sent from the host computer;

byte swap and select means, connected to said internal bus means, for receiving from said memory means the X and Y coordinates stored therein and for selectively transferring groups of less than all the bits within each of the X and Y coordinates;

register, arithmetic and logic means, connected to said byte swap and select means and to said internal bus means, for receiving the groups of bits selectively transferred by said byte swap and select means and for converting said groups of bits into groups of greater than two bytes which are to be received by the graphics terminal; and serial communication means, having parallel input means connected to said internal bus means and having serial output means connected to the serial input of the graphics terminal, for serially sending the groups of greater than two bytes from said register, arithmetic and logic means to the graphics terminal;

programmable read only memory means, connected to said data path means, for storing a program for controlling the operation of said data path means;

branch unit means, connected to said programmable read only memory means, for providing operating addresses to said programable read only memory means so that a program stored therein is utilized; and address recognition, state and control means, connected to said branch unit means and responsive to the control signals from the host computer, for providing address control signals to said branch unit means.

7. An apparatus as defined in claim 6, wherein said byte swap and select means includes:

first multiplexer means, having a first input channel connected to said memory means for receiving a first group of bits within either the X coordinate or the Y coordinate from said memory means, a second input channel connected to said memory means for receiving a second group of bits of the X coordinate or the Y coordinate from said memory means, and a first output channel, for selectively connecting either said first input channel or said second input channel to said first output channel, said first output channel providing a first multiplexer byte of a multiplexer word of information, said first multiplexer byte comprising a selected one of said first and second group of bits; and second multiplexer means, having a third input channel connected to said memory means for receiving said second group of bits of the X coordinate of the Y coordinate from said memory means, a fourth input channel connected to said memory means for receiving said first group of bits of the X coordinate or the Y coordinate from said memory means, and a second output channel, for selectively connecting either said third input channel or said fourth input channel to said second output channel, said second output channel providing a second multiplexer byte of said multiplexer word of information, said second multiplexer byte comprising a selected one of said second and first group of bits.

* * * * *